(12) United States Patent
Gu et al.

(10) Patent No.: US 9,380,298 B1
(45) Date of Patent: Jun. 28, 2016

(54) OBJECT-BASED INTRA-PREDICTION

(75) Inventors: Qunshan Gu, Hayward, CA (US);
Marco Paniconi, Sunnyvale, CA (US)

(73) Assignee: GOOGLE INC., Mountain View, CA (US)

( * ) Notice: Subject to any disclaimer, the term of this patent is extended or adjusted under 35 U.S.C. 154(b) by 854 days.

(21) Appl. No.: 13/571,471

(22) Filed: Aug. 10, 2012

(51) Int. Cl.
*H04N 7/26* (2006.01)
*H04N 19/00* (2014.01)
*H04N 19/17* (2014.01)

(52) U.S. Cl.
CPC ............... *H04N 19/00* (2013.01); *H04N 19/17* (2014.11)

(58) Field of Classification Search
None
See application file for complete search history.

(56) References Cited

U.S. PATENT DOCUMENTS

| | | | |
|---|---|---|---|
| 4,924,310 A | 5/1990 | von Brandt | |
| 5,148,269 A | 9/1992 | de Haan et al. | |
| 5,150,209 A | 9/1992 | Baker et al. | |
| 5,337,086 A | 8/1994 | Fujinami | |
| 5,398,068 A | 3/1995 | Liu et al. | |
| 5,469,273 A | 11/1995 | Demura | |
| 5,510,842 A | 4/1996 | Phillips et al. | |
| 5,512,952 A | 4/1996 | Iwamura | |
| 5,532,744 A | 7/1996 | Akiwumi-Assani et al. | |
| 5,617,541 A | 4/1997 | Albanese et al. | |
| 5,708,473 A | 1/1998 | Mead | |
| 5,731,840 A | 3/1998 | Kikuchi et al. | |
| 5,761,423 A | 6/1998 | Lee | |
| 5,767,987 A | 6/1998 | Wolff et al. | |
| 5,818,967 A | 10/1998 | Bhattacharjee et al. | |
| 5,886,652 A | 3/1999 | Adachi et al. | |
| 5,886,742 A | 3/1999 | Hibi et al. | |
| 5,916,449 A | 6/1999 | Ellwart et al. | |
| 5,930,387 A | 7/1999 | Chan et al. | |
| 5,956,467 A | 9/1999 | Rabbani et al. | |
| 5,991,428 A | 11/1999 | Taniguchi | |
| 5,991,447 A | 11/1999 | Eifrig et al. | |
| 6,005,625 A | 12/1999 | Yokoyama | |

(Continued)

FOREIGN PATENT DOCUMENTS

| | | |
|---|---|---|
| EP | 0634873 | 1/1995 |
| EP | 1903698 | 3/2008 |

(Continued)

OTHER PUBLICATIONS

Cicconi et al., "Efficient Region-Based Motion Estimation and Symmetry Oriented Segmentation for Image Sequence Coding," IEEE Trans. on Circuits and Systems for Video Technology, vol. 4, No. 3, Jun. 1994, pp. 357-364.

(Continued)

*Primary Examiner* — Andy Rao
*Assistant Examiner* — Tyler Edwards
(74) *Attorney, Agent, or Firm* — Young Basile Hanlon & MacFarlane P.C.

(57) ABSTRACT

A method and apparatus for performing object-based intra-prediction encoding and decoding is disclosed. Implementations of object-based intra-prediction encoding and decoding include segmenting a current block into a first portion and at least a second portion; generating, for at least some of a plurality of pixels in the first portion, corresponding predicted values according to at least a first intra-prediction mode; generating, for at least some of a plurality of pixels in the second portion, corresponding predicted values according to at least a second intra-prediction mode; and encoding the current block using the predicted values of the first portion and the predicted values of the second portion.

20 Claims, 23 Drawing Sheets

(56) References Cited

U.S. PATENT DOCUMENTS

| | | | |
|---|---|---|---|
| 6,005,980 A | 12/1999 | Eifrig et al. | |
| 6,044,166 A | 3/2000 | Bassman et al. | |
| 6,058,211 A | 5/2000 | Bormans et al. | |
| 6,104,751 A | 8/2000 | Artieri | |
| 6,108,383 A | 8/2000 | Miller et al. | |
| 6,157,326 A | 12/2000 | Van Der Vleuten et al. | |
| 6,173,012 B1 | 1/2001 | Katta et al. | |
| 6,208,765 B1 | 3/2001 | Bergen | |
| 6,212,235 B1 | 4/2001 | Nieweglowski et al. | |
| 6,256,423 B1 | 7/2001 | Krishnamurthy et al. | |
| 6,272,179 B1 | 8/2001 | Kadono | |
| 6,285,804 B1 | 9/2001 | Crinon et al. | |
| 6,289,049 B1 | 9/2001 | Kim et al. | |
| 6,292,837 B1 | 9/2001 | Miller et al. | |
| 6,314,208 B1 | 11/2001 | Konstantinides et al. | |
| 6,349,154 B1 | 2/2002 | Kleihorst | |
| 6,359,929 B1 | 3/2002 | Boon | |
| 6,381,277 B1 | 4/2002 | Chun et al. | |
| 6,434,197 B1 | 8/2002 | Wang et al. | |
| 6,473,460 B1 | 10/2002 | Topper | |
| 6,542,541 B1 | 4/2003 | Luna et al. | |
| 6,574,273 B1 | 6/2003 | Luna et al. | |
| 6,600,786 B1 | 7/2003 | Prakash et al. | |
| 6,611,620 B1 | 8/2003 | Kobayashi et al. | |
| 6,628,845 B1 | 9/2003 | Stone et al. | |
| 6,650,704 B1 | 11/2003 | Carlson et al. | |
| 6,654,418 B2 | 11/2003 | Haskell et al. | |
| 6,654,419 B1 | 11/2003 | Sriram et al. | |
| 6,687,303 B1 | 2/2004 | Ishihara | |
| 6,711,209 B1 | 3/2004 | Lainema et al. | |
| 6,735,249 B1 | 5/2004 | Karczewicz et al. | |
| 6,775,326 B2 | 8/2004 | Sekiguchi et al. | |
| 6,778,553 B1 | 8/2004 | Chou | |
| 6,907,079 B2 | 6/2005 | Gomila et al. | |
| 7,116,830 B2 | 10/2006 | Srinivasan | |
| 7,158,681 B2 | 1/2007 | Persiantsev | |
| 7,173,968 B1 | 2/2007 | Kutka et al. | |
| 7,184,482 B2 | 2/2007 | Prakash et al. | |
| 7,197,070 B1 | 3/2007 | Zhang et al. | |
| 7,218,674 B2 | 5/2007 | Kuo | |
| 7,253,831 B2 | 8/2007 | Gu | |
| 7,263,125 B2 | 8/2007 | Lainema | |
| 7,333,544 B2 | 2/2008 | Kim et al. | |
| 7,466,774 B2 | 12/2008 | Boyce | |
| 7,602,851 B2 | 10/2009 | Lee et al. | |
| 7,602,997 B2 | 10/2009 | Young | |
| 7,672,377 B2 | 3/2010 | Heng et al. | |
| 7,689,051 B2 | 3/2010 | Mukerjee | |
| 7,711,052 B2 | 5/2010 | Hannuksela et al. | |
| 7,715,475 B1 | 5/2010 | Puri et al. | |
| 7,773,670 B1 | 8/2010 | Puri et al. | |
| 7,924,918 B2 | 4/2011 | Lelescu et al. | |
| 8,000,546 B2 | 8/2011 | Yang et al. | |
| 8,094,722 B2 | 1/2012 | Wang | |
| 8,111,914 B2 | 2/2012 | Lee et al. | |
| 8,135,064 B2 | 3/2012 | Tasaka et al. | |
| 8,208,545 B2 | 6/2012 | Seo et al. | |
| 8,320,470 B2 | 11/2012 | Huang et al. | |
| 8,369,402 B2 | 2/2013 | Kobayashi et al. | |
| 8,503,528 B2 | 8/2013 | Grange et al. | |
| 8,559,512 B2 | 10/2013 | Paz | |
| 8,885,956 B2 | 11/2014 | Sato | |
| 2002/0009153 A1 | 1/2002 | Jeon et al. | |
| 2002/0017565 A1 | 2/2002 | Ju et al. | |
| 2002/0026639 A1 | 2/2002 | Haneda | |
| 2002/0031272 A1 | 3/2002 | Bagni et al. | |
| 2002/0071485 A1 | 6/2002 | Caglar et al. | |
| 2002/0176502 A1 | 11/2002 | Rose et al. | |
| 2002/0181790 A1 | 12/2002 | Nakata | |
| 2003/0035484 A1 | 2/2003 | Prakash et al. | |
| 2003/0138045 A1 | 7/2003 | Murdock et al. | |
| 2003/0202705 A1 | 10/2003 | Sun | |
| 2003/0215018 A1 | 11/2003 | MacInnis et al. | |
| 2003/0215135 A1 | 11/2003 | Caron et al. | |
| 2004/0001634 A1 | 1/2004 | Mehrotra | |
| 2004/0156437 A1 | 8/2004 | Lainema | |
| 2004/0234144 A1 | 11/2004 | Sugimoto et al. | |
| 2004/0252886 A1 | 12/2004 | Pan et al. | |
| 2005/0180500 A1 | 8/2005 | Chiang et al. | |
| 2005/0220352 A1 | 10/2005 | Wemelsfelder | |
| 2005/0265447 A1 | 12/2005 | Park | |
| 2005/0276323 A1 | 12/2005 | Martemyanov et al. | |
| 2006/0056689 A1 | 3/2006 | Wittebrood et al. | |
| 2006/0072664 A1 | 4/2006 | Kwon et al. | |
| 2006/0093038 A1 | 5/2006 | Boyce | |
| 2006/0098738 A1 | 5/2006 | Cosman et al. | |
| 2006/0153304 A1 | 7/2006 | Prakash et al. | |
| 2006/0203916 A1 | 9/2006 | Chandramouly et al. | |
| 2006/0215751 A1 | 9/2006 | Reichel et al. | |
| 2006/0251330 A1 | 11/2006 | Toth et al. | |
| 2006/0285589 A1 | 12/2006 | Hannuksela | |
| 2007/0025441 A1 | 2/2007 | Ugur et al. | |
| 2007/0036354 A1 | 2/2007 | Wee et al. | |
| 2007/0080971 A1 | 4/2007 | Sung | |
| 2007/0121100 A1 | 5/2007 | Divo | |
| 2007/0177673 A1 | 8/2007 | Yang | |
| 2007/0216777 A1 | 9/2007 | Quan et al. | |
| 2007/0217508 A1 | 9/2007 | Shimada et al. | |
| 2007/0217701 A1 | 9/2007 | Liu et al. | |
| 2007/0274385 A1 | 11/2007 | He | |
| 2007/0274388 A1 | 11/2007 | Lee et al. | |
| 2008/0069440 A1 | 3/2008 | Forutanpour | |
| 2008/0152007 A1 | 6/2008 | Sekiguchi et al. | |
| 2008/0170615 A1 | 7/2008 | Sekiguchi et al. | |
| 2008/0181299 A1 | 7/2008 | Tian et al. | |
| 2008/0187053 A1 | 8/2008 | Zhao et al. | |
| 2008/0212678 A1 | 9/2008 | Booth et al. | |
| 2008/0239354 A1 | 10/2008 | Usui | |
| 2008/0260042 A1 | 10/2008 | Shah et al. | |
| 2008/0294962 A1 | 11/2008 | Goel | |
| 2008/0310745 A1 | 12/2008 | Ye et al. | |
| 2009/0161763 A1 | 6/2009 | Rossignol et al. | |
| 2009/0190659 A1 | 7/2009 | Lee et al. | |
| 2009/0196342 A1 | 8/2009 | Divorra Escoda et al. | |
| 2009/0232401 A1 | 9/2009 | Yamashita et al. | |
| 2009/0257492 A1 | 10/2009 | Andersson et al. | |
| 2010/0021009 A1 | 1/2010 | Yao | |
| 2010/0023979 A1 | 1/2010 | Patel et al. | |
| 2010/0034265 A1 | 2/2010 | Kim et al. | |
| 2010/0034268 A1* | 2/2010 | Kusakabe | G06K 9/00261 375/240.15 |
| 2010/0061444 A1 | 3/2010 | Wilkins et al. | |
| 2010/0074332 A1 | 3/2010 | Karczewicz et al. | |
| 2010/0086028 A1 | 4/2010 | Tanizawa et al. | |
| 2010/0098169 A1 | 4/2010 | Budagavi | |
| 2010/0104021 A1 | 4/2010 | Schmit | |
| 2010/0111182 A1 | 5/2010 | Karczewicz et al. | |
| 2010/0118943 A1* | 5/2010 | Shiodera | H04N 19/105 375/240.12 |
| 2010/0118945 A1 | 5/2010 | Wada et al. | |
| 2010/0128796 A1 | 5/2010 | Choudhury | |
| 2010/0142761 A1 | 6/2010 | Venkatapuram et al. | |
| 2010/0195715 A1 | 8/2010 | Liu et al. | |
| 2010/0278234 A1 | 11/2010 | Jeong et al. | |
| 2010/0329334 A1 | 12/2010 | Kim et al. | |
| 2010/0329341 A1 | 12/2010 | Kam et al. | |
| 2011/0002541 A1 | 1/2011 | Varekamp | |
| 2011/0007977 A1 | 1/2011 | Amonou et al. | |
| 2011/0026591 A1 | 2/2011 | Bauza et al. | |
| 2011/0033125 A1 | 2/2011 | Shiraishi | |
| 2011/0069890 A1 | 3/2011 | Besley | |
| 2011/0158529 A1 | 6/2011 | Malik | |
| 2011/0211757 A1 | 9/2011 | Kim et al. | |
| 2011/0235706 A1 | 9/2011 | Demircin et al. | |
| 2011/0243225 A1 | 10/2011 | Min et al. | |
| 2011/0243229 A1 | 10/2011 | Kim et al. | |
| 2011/0243230 A1 | 10/2011 | Liu | |
| 2011/0249741 A1 | 10/2011 | Zhao et al. | |
| 2011/0249743 A1 | 10/2011 | Zhao et al. | |
| 2011/0255592 A1 | 10/2011 | Sung et al. | |
| 2011/0264676 A1 | 10/2011 | Belan et al. | |
| 2011/0268359 A1 | 11/2011 | Steinberg et al. | |
| 2011/0293001 A1 | 12/2011 | Lim et al. | |
| 2012/0014436 A1 | 1/2012 | Segall et al. | |

(56) References Cited

U.S. PATENT DOCUMENTS

| | | |
|---|---|---|
| 2012/0014437 A1 | 1/2012 | Segall et al. |
| 2012/0014438 A1 | 1/2012 | Segall et al. |
| 2012/0014439 A1 | 1/2012 | Segall et al. |
| 2012/0014440 A1 | 1/2012 | Segall et al. |
| 2012/0014444 A1 | 1/2012 | Min et al. |
| 2012/0020408 A1 | 1/2012 | Chen et al. |
| 2012/0039388 A1 | 2/2012 | Kim et al. |
| 2012/0057630 A1 | 3/2012 | Saxena et al. |
| 2012/0082220 A1 | 4/2012 | Mazurenko et al. |
| 2012/0106637 A1 | 5/2012 | Lee et al. |
| 2012/0106646 A1 | 5/2012 | Cammas et al. |
| 2012/0114035 A1 | 5/2012 | Nakagomi et al. |
| 2012/0114039 A1 | 5/2012 | Wang |
| 2012/0201475 A1 | 8/2012 | Carmel et al. |
| 2012/0278433 A1 | 11/2012 | Liu et al. |
| 2012/0287998 A1 | 11/2012 | Sato |
| 2012/0307884 A1 | 12/2012 | MacInnis |
| 2012/0314942 A1 | 12/2012 | Williams et al. |
| 2013/0027230 A1 | 1/2013 | Marpe et al. |

FOREIGN PATENT DOCUMENTS

| | | |
|---|---|---|
| JP | 2007267414 | 10/2007 |
| WO | WO02093488 | 11/2002 |
| WO | WO2005094083 | 10/2005 |
| WO | WO2010149900 | 12/2010 |

OTHER PUBLICATIONS

Salembier et al., "Segmentation-Based Video Coding system Allowing the Manipulation of Objects," IEEE Trans. on Circuits and Systems for Video Technology, vol. 7, No. 1, Feb. 1997, pp. 60-74.
Zhang, Kui, et al.; "Variable Block Size Video Coding With Motion Prediction and Motion Segmentation", SPIE vol. 2419, 1995, 9 pp.
Chen, Michael C., et al.; "Design and Optimization of a Differentially Coded Variable Block Size Motion Compensation System", IEEE 1996, 4 pp.
Chen, Xing C., et al.; "Quadtree Based Adaptive Lossy Coding of Motion Vectors", IEEE 1996, 4 pp.
Chung R H Y et al. "Efficient Block-Based Motion Segmentation Method using Motion Vector Consistency"; Proceedings of the Ninth Conference on Machine Vision Application: Tsukuba Science City, Japan; May 16-18, 2005.
Ebrahimi T Ed—Institute of Electrical and Electronics Engineers: "A new technique for motion field segmentation and coding for very low bitrate video coding applications"; Proceedings of the International Conference on Image Processing (ICIP); Austin, Nov. 13-16, 1994.
Glaser-Garrett, Jason, "A novel macroblock-tree algorithm for high-performance optimization of dependent video coding in H.264/AVC", Department of Computer Science, Harvey Mudd College, Date Unknown, 12 pp.
Guillotel, Philippe, et al.; "Comparison of motion vector coding techniques", SPIE vol. 2308, 1994, 11 pp.
Han et al., "Jointly Optimized Spatial Prediction and Block Transform for Video and Image Coding," IEEE Transactions on Image Processing, vol. 21, No. 4 (Apr. 2012).
Han et al., "Toward Jointly Optimal Spatial Prediction and Adaptive Transform in Video/Image Coding," ICASSP 2010 (Dallas, TX, Mar. 14-19, 2010).
Karczewicz, Maria, et al.; "Video Coding Using Motion Compensation With Polynomial Motion Vector Fields", IEEE COMSOC EURASIP, First International Workshop on Wireless Image/Video Communications—Sep. 1996, 6 pp.
Kim, Jong Won, et al.; "On the Hierarchical Variable Block Size Motion Estimation Technique for Motion Sequence Coding", SPIE Visual Communication and Image Processing 1993, Cambridge, MA, Nov. 8, 1993, 29 pp.
Liu, Bede, et al.; "A simple method to segment motion field for video coding", SPIE vol. 1818, Visual Communications and Image Processing 1992, 10 pp.
Liu, Bede, et al.; "New Fast Algorithms for the Estimation of Block Motion Vectors", IEEE Transactions on Circuits and Systems for Video Technology, vol. 3, No. 2, Apr. 1993, 10 pp.
Luttrell, Max, et al.; "Simulation Results for Modified Error Resilient Syntax With Data Partitioning and RVLC", ITU-Telecommunications Standardization Sector, Study Group 16, Video Coding Experts Group (Question 15), Sixth Meeting: Seoul, South Korea, Nov. 2, 1998, 34 pp.
Martin, Graham R., et al.; "Reduced Entropy Motion Compensation Using Variable Sized Blocks", SPIE vol. 3024, 1997, 10 pp.
Nicolas, H., et al.; "Region-based motion estimation using deterministic relaxation schemes for image sequence coding", IEEE 1992, 4 pp.
Nokia, Inc., Nokia Research Center, "MVC Decoder Description", Telecommunication Standardization Sector, Study Period 1997-2000, Geneva, Feb. 7, 2000, 99 pp.
Orchard, Michael T.; "Exploiting Scene Structure in Video Coding", IEEE 1991, 5 pp.
Orchard, Michael T.; "Predictive Motion-Field Segmentation for Image Sequence Coding", IEEE Transactions on Circuits and Systems for Video Technology, vol. 3, No. 1, Feb. 1993, 17 pp.
Park, Jun Sung, et al., "Selective Intra Prediction Mode Decision for H.264/AVC Encoders", World Academy of Science, Engineering and Technology 13, (2006).
Schiller, H., et al.; "Efficient Coding of Side Information in a Low Bitrate Hybrid Image Coder", Signal Processing 19 (1990) Elsevier Science Publishers B.V. 61-73, 13 pp.
Schuster, Guido M., et al.; "A Video Compression Scheme With Optimal Bit Allocation Among Segmentation, Motion, and Residual Error", IEEE Transactions on Image Processing, vol. 6, No. 11, Nov. 1997, 16 pp.
Series H: Audiovisual and Multimedia Systems, Infrastructure of audiovisual services—Coding of moving video, Video coding for low bit rate communication, International Telecommunication Union, ITU-T Recommendation H.263, Feb. 1998, 167 pp.
Steliaros, Michael K., et al.; "Locally-accurate motion estimation for object-based video coding", SPIE vol. 3309, 1997, 11 pp.
Stiller, Christoph; "Motion-Estimation for Coding of Moving Video at 8 kbit/s with Gibbs Modeled Vectorfield Smoothing", SPIE vol. 1360 Visual Communications and Image Processing 1990, 9 pp.
Strobach, Peter; "Tree-Structured Scene Adaptive Coder", IEEE Transactions on Communications, vol. 38, No. 4, Apr. 1990, 10 pp.
Wiegand, Thomas, et al.; "Long-Term Memory Motion-Compensated Prediction", Publication Unknown, Date Unknown, 15 pp.
Wiegand, Thomas, et al.; "Rate-Distortion Optimized Mode Selection for Very Low Bit Rate Video Coding and the Emerging H.263 Standard", IEEE Transactions on Circuits and Systems for Video Technology, vol. 6, No. 2, Apr. 1996, 9 pp.
Wright, R. Glenn, et al.; "Multimedia—Electronic Technical Manual for ATE", IEEE 1996, 3 pp.
Su M_T Sun University of Washington et al. "Encoder Optimization for H.264/AVC Fidelity Range Extensions" Jul. 12, 2005.
"Series H: Audiovisual and Multimedia Systems; Infrastructure of audiovisual services—Coding of moving video; Advanced video coding for generic audiovisual services". H.264. Version 1. International Telecommunication Union. Dated May 2003.
"Series H: Audiovisual and Multimedia Systems; Infrastructure of audiovisual services—Coding of moving video; Advanced video coding for generic audiovisual services". H.264. Version 3. International Telecommunication Union. Dated Mar. 2005.
"Overview; VP7 Data Format and Decoder". Version 1.5. On2 Technologies, Inc. Dated Mar. 28, 2005.
"Series H: Audiovisual and Multimedia Systems; Infrastructure of audiovisual services—Coding of moving video; Advanced video coding for generic audiovisual services". H.264. Amendment 1: Support of additional colour spaces and removal of the High 4:4:4 Profile. International Telecommunication Union. Dated Jun. 2006.
"VP6 Bitstream & Decoder Specification". Version 1.02. On2 Technologies, Inc. Dated Aug. 17, 2006.
"Series H: Audiovisual and Multimedia Systems; Infrastructure of audiovisual services—Coding of moving video". H.264. Amendment 2: New profiles for professional applications. International Telecommunication Union. Dated Apr. 2007.

(56) References Cited

OTHER PUBLICATIONS

"VP6 Bitstream & Decoder Specification". Version 1.03. On2 Technologies, Inc. Dated Oct. 29, 2007.
"Series H: Audiovisual and Multimedia Systems; Infrastructure of audiovisual services—Coding of moving video". H.264. Advanced video coding for generic audiovisual services. Version 8. International Telecommunication Union. Dated Nov. 1, 2007.
"Series H: Audiovisual and Multimedia Systems; Infrastructure of audiovisual services—Coding of moving video". H.264. Advanced video coding for generic audiovisual services. International Telecommunication Union. Version 11. Dated Mar. 2009.
"Series H: Audiovisual and Multimedia Systems; Infrastructure of audiovisual services—Coding of moving video". H.264. Advanced video coding for generic audiovisual services. International Telecommunication Union. Version 12. Dated Mar. 2010.
"Implementors' Guide; Series H: Audiovisual and Multimedia Systems; Coding of moving video: Implementors Guide for H.264: Advanced video coding for generic audiovisual services". H.264. International Telecommunication Union. Version 12. Dated Jul. 30, 2010.
"VP8 Data Format and Decoding Guide". WebM Project. Google On2. Dated: Dec. 1, 2010.
Bankoski et al. "VP8 Data Format and Decoding Guide; draft-bankoski-vp8-bitstream-02" Network Working Group. Dated May 18, 2011.
Bankoski et al. "Technical Overview of VP8, an Open Source Video CODEC for the Web". Dated Jul. 11, 2011.
Bankoski, J., Koleszar, J., Quillio, L., Salonen, J., Wilkins, P., and Y. Xu, "VP8 Data Format and Decoding Guide", RFC 6386, Nov. 2011.
Mozilla, "Introduction to Video Coding Part 1: Transform Coding", Video Compression Overview, Mar. 2012, 171 pp.
Pan et al., "Fast mode decision algorithms for inter/intra prediction in H.264 video coding." Advances in Multimedia nformation Processing PCM 2007 Springer Berlin Heidelberg, 2007. pp. 158-167.
Kim et al., "Fast H.264 intra-prediction mode selection using joint spatial and transform domain features." Journal of Visual Communication and Image Representation 17.2, 2006, pp. 291-310.

\* cited by examiner

| DTLC | T0 | T1 | T2 | T3 | T4 | T5 | T6 | T7 |
|------|------|------|------|------|----|----|----|----|
| L0 | DBLK (0,0) | DBLK (1,0) | DBLK (2,0) | DBLK (3,0) | | | | |
| L1 | DBLK (0,1) | DBLK (1,1) | DBLK (2,1) | DBLK (3,1) | | | | |
| L2 | DBLK (0,2) | DBLK (1,2) | DBLK (2,2) | DBLK (3,2) | | | | |
| L3 | DBLK (0,3) | DBLK (1,3) | DBLK (2,3) | DBLK (3,3) | | | | |

FIG. 6

| | | | |
|---|---|---|---|
| X | 0 | 0 | 0 |
| X | 0 | 0 | 0 |
| X | 0 | 0 | 0 |
| X | X | X | X |

FIG. 7A

| DTLC | T0 | T1 | T2 | T3 | T4 | T5 | T6 | T7 |
|---|---|---|---|---|---|---|---|---|
| L0 | L0 | T1 | T2 | T3 | | | | |
| L1 | L1 | T1 | T2 | T3 | | | | |
| L2 | L2 | T1 | T2 | T3 | | | | |
| L3 | L3 | L3 | L3 | L3 | | | | |

FIG. 7B

|   |   |   |   |
|---|---|---|---|
| X | X | 0 | 0 |
| X | X | 0 | 0 |
| X | X | X | X |
| X | X | X | X |

FIG. 8A

| DTLC | T0 | T1 | T2 | T3 | T4 | T5 | T6 | T7 |
|------|----|----|----|----|----|----|----|----|
| L0 | L0 | L0 | T2 | T3 | | | | |
| L1 | L1 | L1 | T2 | T3 | | | | |
| L2 | L2 | L2 | L2 | L2 | | | | |
| L3 | L3 | L3 | L3 | L3 | | | | |

| DTLC | T0 | T1 | T2 | T3 | T4 | T5 | T6 | T7 |
|------|----|----|----|----|----|----|----|----|
| L0 | L0 | T1 | T2 | T3 | | | | |
| L1 | L1 | L1 | L1 | T3 | | | | |
| L2 | L2 | L2 | L2 | T3 | | | | |
| L3 | L3 | L3 | L3 | T3 | | | | |

| DTLC | T0 | T1 | T2 | T3 | T4 | T5 | T6 | T7 |
|------|----|----|----|----|----|----|----|----|
| L0   | T0 | T1 | T2 | T3 |    |    |    |    |
| L1   | T0 | T1 | T2 | T3 |    |    |    |    |
| L2   | L2 | L2 | T2 | T3 |    |    |    |    |
| L3   | L3 | L3 | T2 | T3 |    |    |    |    |

FIG. 10B

| | | | |
|---|---|---|---|
| X | X | X | X |
| X | 0 | 0 | 0 |
| X | 0 | 0 | 0 |
| X | 0 | 0 | 0 |

FIG. 11A

| DTLC | T0 | T1 | T2 | T3 | T4 | T5 | T6 | T7 |
|---|---|---|---|---|---|---|---|---|
| L0 | T0 | T1 | T2 | T3 | | | | |
| L1 | L1 | $\frac{T6+T7}{2}$ | $\frac{T6+T7}{2}$ | $\frac{T6+T7}{2}$ | | | | |
| L2 | L2 | $\frac{T6+T7}{2}$ | $\frac{T6+T7}{2}$ | $\frac{T6+T7}{2}$ | | | | |
| L3 | L3 | $\frac{T6+T7}{2}$ | $\frac{T6+T7}{2}$ | $\frac{T6+T7}{2}$ | | | | |

| 0 | 0 | 0 | X |
|---|---|---|---|
| 0 | 0 | 0 | X |
| 0 | 0 | 0 | X |
| X | X | X | X |

FIG. 13A

| DTLC | T0 | T1 | T2 | T3 | T4 | T5 | T6 | T7 |
|---|---|---|---|---|---|---|---|---|
| L0 | $\frac{T0+L0}{2}$ | $\frac{T1+L0}{2}$ | $\frac{T2+L0}{2}$ | T3 | | | | |
| L1 | $\frac{T0+L1}{2}$ | $\frac{T1+L1}{2}$ | $\frac{T2+L1}{2}$ | T3 | | | | |
| L2 | $\frac{T0+L0}{2}$ | $\frac{T1+L2}{2}$ | $\frac{T2+L2}{2}$ | T3 | | | | |
| L3 | L3 | L3 | L3 | T3 | | | | |

| DTLC | T0 | T1 | T2 | T3 | T4 | T5 | T6 | T7 |
|---|---|---|---|---|---|---|---|---|
| L0 | $\frac{T0+L0}{2}$ | $\frac{T1+L0}{2}$ | T2 | T3 | | | | |
| L1 | $\frac{T0+L1}{2}$ | $\frac{T1+L1}{2}$ | T2 | T3 | | | | |
| L2 | L2 | L2 | T2 | T3 | | | | |
| L3 | L3 | L3 | T2 | T3 | | | | |

| DTLC | T0 | T1 | T2 | T3 | T4 | T5 | T6 | T7 |
|------|----|----|----|----|----|----|----|----|
| L0 | L0 | T1 | T2 | T3 | | | | |
| L1 | L1 | T1 | T2 | T3 | | | | |
| L2 | L2 | T1 | T2 | T3 | | | | |
| L3 | L3 | T1 | T2 | T3 | | | | |

FIG. 16B

| X | X | 0 | 0 |
|---|---|---|---|
| X | X | 0 | 0 |
| X | X | 0 | 0 |
| X | X | 0 | 0 |

FIG. 17A

| DTLC | T0 | T1 | T2 | T3 | T4 | T5 | T6 | T7 |
|---|---|---|---|---|---|---|---|---|
| L0 | L0 | L0 | T2 | T3 | | | | |
| L1 | L1 | L1 | T2 | T3 | | | | |
| L2 | L2 | L2 | T2 | T3 | | | | |
| L3 | L3 | L3 | T2 | T3 | | | | |

FIG. 17B

| | | | |
|---|---|---|---|
| X | X | X | 0 |
| X | X | X | 0 |
| X | X | X | 0 |
| X | X | X | 0 |

FIG. 18A

| DTLC | T0 | T1 | T2 | T3 | T4 | T5 | T6 | T7 |
|---|---|---|---|---|---|---|---|---|
| L0 | L0 | L0 | L0 | T3 | | | | |
| L1 | L1 | L1 | L1 | T3 | | | | |
| L2 | L2 | L2 | L2 | T3 | | | | |
| L3 | L3 | L3 | L3 | T3 | | | | |

| DTLC | T0 | T1 | T2 | T3 | T4 | T5 | T6 | T7 |
|------|----|----|----|----|----|----|----|----|
| L0 | L0 | L0 | L0 | L0 | | | | |
| L1 | L1 | L1 | L1 | L1 | | | | |
| L2 | L2 | L2 | L2 | L2 | | | | |
| L3 | L3 | L3 | L3 | L3 | | | | |

| | | | |
|---|---|---|---|
| X | X | X | X |
| X | X | X | 0 |
| X | X | 0 | 0 |
| X | 0 | 0 | 0 |

FIG. 21A

| DTLC | T0 | T1 | T2 | T3 | T4 | T5 | T6 | T7 |
|---|---|---|---|---|---|---|---|---|
| L0 | $\frac{T1+L1}{2}$ | T2 | T3 | T4 | | | | |
| L1 | L2 | $\frac{T3+L3}{2}$ | $\frac{3T4+LP4}{4}$ | T5 | | | | |
| L2 | L3 | $\frac{T4+LP4}{2}$ | T5 | T6 | | | | |
| L3 | $\frac{T4+3LP4}{4}$ | T5 | T6 | T7 | | | | |
| LP4 | | | | | | | | |

| DTLC | T0 | T1 | T2 | T3 | T4 | T5 | T6 | T7 |
|---|---|---|---|---|---|---|---|---|
| L0 | $\frac{T1+L1}{2}$ | T2 | T3 | T4 | | | | |
| L1 | L2 | $\frac{T3+L3}{2}$ | $\frac{2L3-L2+T4}{2}$ | T3 | | | | |
| L2 | L3 | $\frac{2L3-L2+T4}{2}$ | $\frac{T2+L2}{2}$ | T2 | | | | |
| L3 | $\frac{2L3-L2+T4}{2}$ | L3 | L2 | $\frac{T1+L1}{2}$ | | | | |
| LP4 | | | | | | | | |

FIG. 22B

OBJECT-BASED INTRA-PREDICTION

TECHNICAL FIELD

This disclosure relates to video encoding and decoding.

BACKGROUND

Digital video streams typically represent video using a sequence of frames or still images. Digital video can be used for various applications including, for example, video conferencing, high definition video entertainment, video advertisements, or sharing of user-generated videos. A digital video stream may contain a large amount of data and may utilize substantial resources, such as processing, transmission, and storage resources. Various approaches have been proposed to reduce the amount of data in video streams, including compression and other encoding techniques.

SUMMARY

Implementations of systems, methods, and apparatuses for encoding and decoding a video signal using object-based intra-prediction are disclosed herein.

One aspect of the disclosed implementations is a method for encoding a video stream including a plurality of frames having a plurality of blocks including a current block. The method includes segmenting the current block into a first portion and at least a second portion; generating, for at least some of a plurality of pixels in the first portion, corresponding predicted values according to at least a first intra-prediction mode; generating, for at least some of a plurality of pixels in the second portion, corresponding predicted values according to at least a second intra-prediction mode; and encoding the current block using the predicted values for the first portion and the predicted values for the second portion.

Another aspect of the disclosed implementations is an apparatus for encoding a video stream including a plurality of frames having a plurality of blocks including a current block. The apparatus includes a memory and a processor configured to execute instructions stored in the memory to segment the current block into a first portion and at least a second portion; generate, for at least some of a plurality of pixels in the first portion, corresponding predicted values according to at least a first intra-prediction mode; generate, for at least some of a plurality of pixels in the second portion, a corresponding predicted values according to at least a second intra-prediction mode; and encode the current block using the predicted value for the first portion and the predicted value for the second portion.

Variations in these and other aspects are described in additional detail hereafter.

BRIEF DESCRIPTION OF THE DRAWINGS

The description herein makes reference to the accompanying drawings wherein like reference numerals refer to like parts throughout the several views, and wherein:

FIG. 6 is a diagram of an example of a block using intra-prediction in accordance with implementations of this disclosure;

FIGS. 7A-22B are diagrams of blocks and corresponding prediction blocks using object-based intra-prediction in accordance with implementations of this disclosure.

DETAILED DESCRIPTION

Digital video is used for various purposes including, for example, remote business meetings via video conferencing, high definition video entertainment, video advertisements, and sharing of user-generated videos. The generation, storage, transmission, and display of a video signal, such as high quality digital video communicated using a limited bandwidth medium, can include video compression using one or more video encoding and decoding schemes. Video encoding and decoding can include using prediction schemes, such as inter-prediction and intra-prediction, to reduce redundancy and improve compression efficiency.

Intra-prediction schemes may improve compression efficiency by generating predicted pixel values based on directional similarities, such as horizontal or vertical similarities, between pixels in a video signal, such as pixels in one or more blocks in a frame. However, intra-prediction based on directional similarities may be inefficient for predicting pixel values for blocks that includes multiple directional features or objects. To improve compression efficiency for blocks including multiple directional features, object-based intra-prediction may be used.

Implementations of object-based intra-prediction may include predicting pixel values for a block in a frame of an input video signal using a combination of intra-prediction modes. For example, a block can be segmented into portions (objects) based on one or more defined segmentation schemes, and a prediction mode, such as an object-based prediction mode, may be identified for predicting pixel values in each respective object. The segmentation schemes may be selected so that each segmented portion includes highly correlated data. For example, a segmented portion may correspond to an object, or part of an object, captured in a video scene, and a prediction mode may be identified for predicting pixel values for each respective segmented portion.

In some implementations, object-based prediction modes, such as one or more of the object-based prediction modes shown in FIGS. 7A-22B, may be used in combination with directional prediction modes, such as horizontal prediction or vertical prediction. For example, a block may be segmented into two objects. One of the objects may be predicted using an object-based prediction mode, and the other object may be predicted using a directional prediction mode. In another example, a block, or a portion of a block, may be predicted using an object-based prediction mode and a directional prediction mode.

Figure 1:
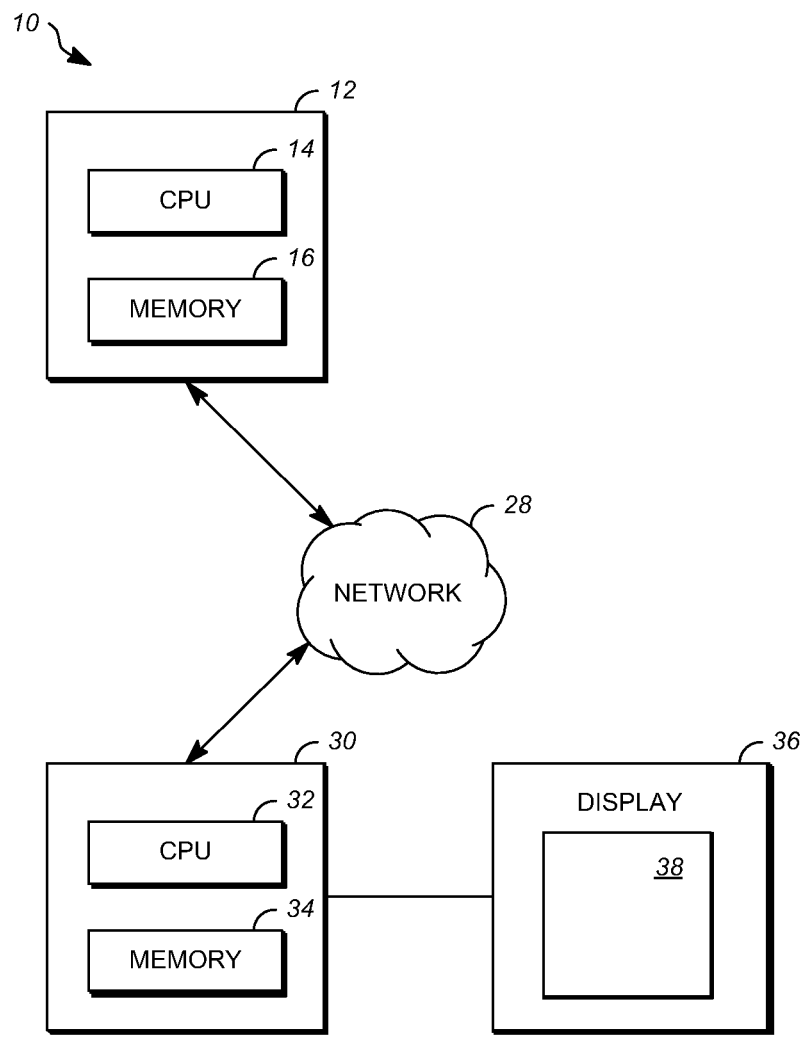
FIG. 1 is a schematic of a video encoding and decoding system.

FIG. 1 is a schematic of a video encoding and decoding system 10 in which aspects of the disclosure can be implemented. An transmitting station 12 can be, for example, a computer having an internal configuration of hardware including a processor such as a central processing unit (CPU) 14 and a memory 16. CPU 14 is a controller for controlling the operations of transmitting station 12. CPU 14 can be connected to the memory 16 by, for example, a memory bus. Memory 16 can be read only memory (ROM), random access memory (RAM) or any other suitable memory device. Memory 16 can store data and program instructions that are used by CPU 14. Other suitable implementations of transmitting station 12 are possible. For example, the processing of transmitting station 12 can be distributed among multiple devices.

A network 28 connects transmitting station 12 and a receiving station 30 for encoding and decoding of the video stream. For example, the video stream can be encoded in transmitting station 12 and the encoded video stream can be decoded in receiving station 30. Network 28 can be, for example, the Internet. Network 28 can also be a local area network (LAN), wide area network (WAN), virtual private network (VPN), a cellular telephone network or any other means of transferring the video stream from transmitting station 12 to, in this example, receiving station 30.

Receiving station 30 can, in one example, be a computer having an internal configuration of hardware including a processor such as a CPU 32 and a memory 34. CPU 32 is a controller for controlling the operations of receiving station 30. CPU 32 can be connected to memory 34 by, for example, a memory bus. Memory 34 can be ROM, RAM or any other suitable memory device. Memory 34 can store data and program instructions that are used by CPU 32. Other suitable implementations of receiving station 30 are possible. For example, the processing of receiving station 30 can be distributed among multiple devices.

A display 36 configured to display a video stream can be connected to receiving station 30. Display 36 can be implemented in various ways, including by a liquid crystal display (LCD), a cathode-ray tube (CRT), or a light emitting diode display (LED), such as an OLED display. Display 36 is coupled to CPU 32 and can be configured to display a rendering 38 of the video stream decoded in receiving station 30.

Other implementations of the encoder and decoder system 10 are also possible. For example, one implementation can omit network 28 and/or display 36. In another implementation, a video stream can be encoded and then stored for transmission at a later time by receiving station 30 or any other device having memory. In one implementation, receiving station 30 receives (e.g., via network 28, a computer bus, and/or some communication pathway) the encoded video stream and stores the video stream for later decoding. In another implementation, additional components can be added to the encoder and decoder system 10. For example, a display or a video camera can be attached to transmitting station 12 to capture the video stream to be encoded.

Figure 2:
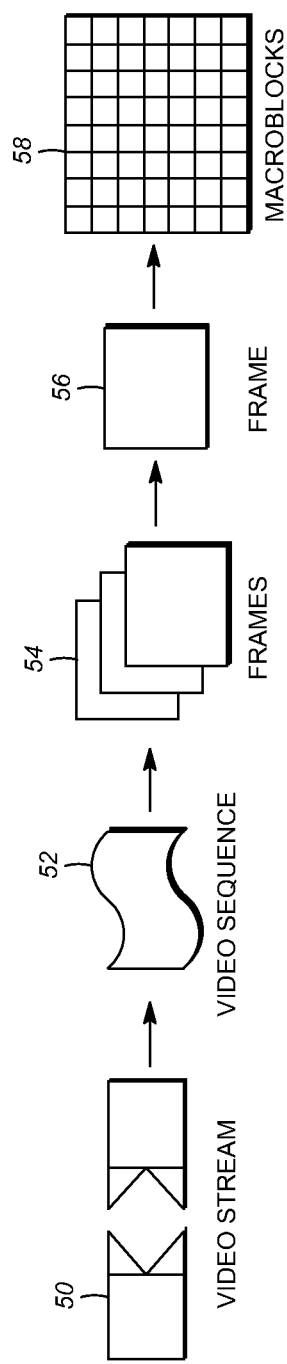
FIG. 2 is a diagram of an example video stream for encoding and decoding.

FIG. 2 is a diagram of a typical video stream 50 to be encoded and decoded. Video stream 50 (also referred to herein as video data) includes a video sequence 52. At the next level, video sequence 52 includes a number of adjacent frames 54. While three frames are depicted in adjacent frames 54, video sequence 52 can include any number of adjacent frames. Adjacent frames 54 can then be further subdivided into individual frames, e.g., a single frame 56. Each frame 56 can capture a scene with one or more objects, such as people, background elements, graphics, text, a blank wall, or any other information.

At the next level, single frame 56 can be divided into a set of blocks 58, which can contain data corresponding to, in some of the examples described below, a 4×4 pixel group in frame 56. Block 58 can also be of any other suitable size such as a block of 16×8 pixels, a block of 8×8 pixels, a block of 16×16 pixels or of any other size. Depending on the application, block 58 can also refer to a subblock, which is a subdivision of a macroblock. Unless otherwise noted, the term 'block' can include a subblock, a macroblock, a segment, a slice, a residual block or any other portion of a frame. A frame, a block, a pixel, or a combination thereof can include display information, such as luminance information, chrominance information, or any other information that can be used to store, modify, communicate, or display the video stream or a portion thereof.

Figure 3:
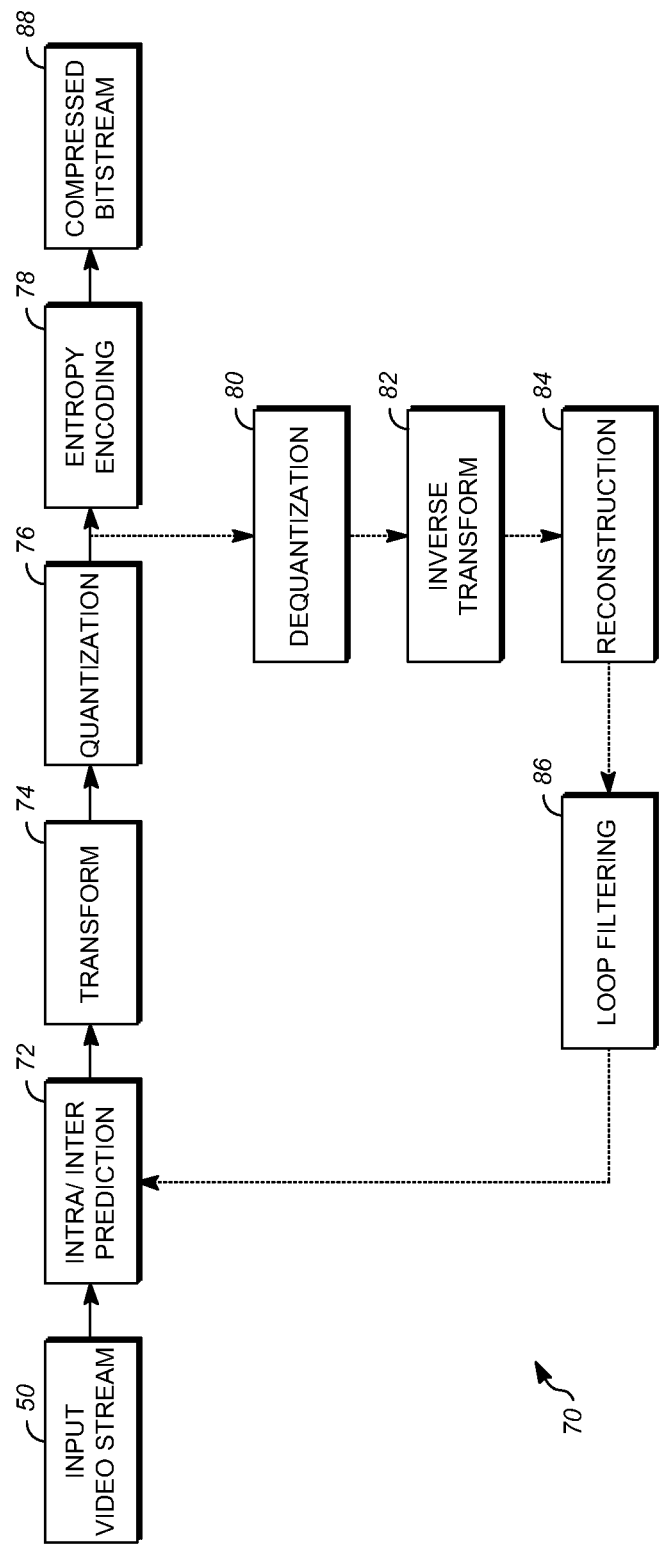
FIG. 3 is a block diagram of a video compression system in accordance with implementations of this disclosure.

FIG. 3 is a block diagram of an encoder 70 in accordance with one implementation. Encoder 70 can be implemented, as described above, in transmitting station 12 such as by providing a computer software program stored in memory 16, for example. The computer software program can include machine instructions that, when executed by CPU 14, cause transmitting station 12 to encode video data in the manner described in FIG. 3. Encoder 70 can also be implemented as specialized hardware in, for example, transmitting station 12. Encoder 70 has the following stages to perform the various functions in a forward path (shown by the solid connection lines) to produce an encoded or a compressed bitstream 88 using input video stream 50: an intra/inter-prediction stage 72, a transform stage 74, a quantization stage 76, and an entropy encoding stage 78. Encoder 70 may include a reconstruction path (shown by the dotted connection lines) to reconstruct a frame for encoding of future blocks. In FIG. 3, encoder 70 has the following stages to perform the various functions in the reconstruction path: a dequantization stage 80, an inverse transform stage 82, a reconstruction stage 84, and a loop filtering stage 86. Other structural variations of encoder 70 can be used to encode video stream 50.

When video stream 50 is presented for encoding, each frame 56 within video stream 50 can be processed in units of blocks. At intra/inter-prediction stage 72, each block of the multiple sub-images can be encoded using either intra-prediction (i.e., within a single frame) or inter-prediction (i.e. from frame to frame). In either case, a prediction block can be formed. The prediction block is then subtracted from the current block to produce a residual block (also referred to herein as residual).

Intra-prediction (also referred to herein as intra-prediction or intra-frame prediction) and inter-prediction (also referred to herein as inter-prediction or inter-frame prediction) are techniques used in modern image/video compression schemes. In the case of intra-prediction, a prediction block can be formed from samples in the current frame that have been previously encoded and reconstructed. In the case of inter-prediction, a prediction block can be formed from samples in one or more previously constructed reference frames.

The prediction block is then subtracted from the current block; the difference, i.e., the residual is then encoded and transmitted to decoders. Image or video codecs may support many different intra and inter-prediction modes; each image block can use one of the prediction modes to provide a prediction block that is most similar to the current block to minimize the information to be encoded in the residual. The prediction mode for each block can also be encoded and transmitted, so a decoder can use same prediction mode(s) to form prediction blocks in the decoding and reconstruction process.

The prediction mode can be selected from one of multiple intra-prediction modes defined in video standards such as H.264, VPx and HEVC. The multiple intra-prediction modes can include, for example, DC prediction mode, horizontal prediction mode, vertical prediction mode, and true motion prediction mode (which can also be referred to as TM_PRED). In one implementation of DC prediction mode, a single value using the average of the pixels in a row above a current block and a column to the left of the current block can be used to predict the current block. In one implementation of horizontal prediction, each column of a current block can be filled with a copy of a column to the left of the current block. In one implementation of vertical prediction, each row of a current block can be filled with a copy of a row above the current block. In one implementation of TrueMotion prediction, in addition to the row above the current block and the column to the left of the current block, TM_PRED uses the pixel P above and to the left of the block. Horizontal differences between pixels in the row above the current block (starting from P) are propagated using the pixels from the column to the left of the current block to start each row. Other intra-prediction modes can include object-based prediction modes, such as the object-based prediction modes shown in FIGS. 7-22.

The prediction mode can also be selected from one of multiple inter-prediction modes including, for example, golden frame prediction mode, last frame prediction mode, alternative reference frame prediction mode, or any other prediction mode using any reference frame in an encoding scheme. In one implementation of the last frame prediction mode, the current block can be predicted by using the blocks in the immediate previous frame. In one implementation of the golden frame prediction mode, the current block can be predicted by using blocks in a golden frame selected from an arbitrarily distance past of the video stream. The golden frame is usually coded at a higher than average quality. In one implementation of the alternative reference frame prediction mode, an alternative reference frame constructed from multiple source frames of the video data can be used to predict the current block. When an inter-prediction mode is selected, a motion vector can also be encoded, which describes the position of the prediction block relative to the current block (e.g., offsets of the coordinates).

Next, still referring to FIG. 3, transform stage 74 transforms the residual into transform coefficients in, for example, the frequency domain. Examples of block-based transforms include the Karhunen-Loéve Transform (KLT), the Discrete Cosine Transform (DCT), and the Singular Value Decomposition Transform (SVD). In one example, the DCT transforms the block into the frequency domain. In the case of DCT, the transform coefficient values are based on spatial frequency, with the lowest frequency (e.g., DC) coefficient at the top-left of the matrix and the highest frequency coefficient at the bottom-right of the matrix.

Quantization stage 76 converts the transform coefficients into discrete quantum values, which are referred to as quantized transform coefficients, using a quantizer value or quantization levels. The quantized transform coefficients are then entropy encoded by entropy encoding stage 78. The entropy-encoded coefficients, together with other information used to decode the block, which can include, for example, the type of prediction used, motion vectors, and a quantization value, are then output to compressed bitstream 88. Compressed bitstream 88 can be formatted using various techniques, such as variable length encoding (VLC) and arithmetic coding. Compressed bitstream 88 can also be referred to as an encoded video stream and the terms will be used interchangeably herein.

The reconstruction path in FIG. 3 (shown by the dotted connection lines) can be used to provide both encoder 70 and a decoder 100 (described below) with the same reference frames to decode compressed bitstream 88. The reconstruction path performs functions that are similar to functions that take place during the decoding process that are discussed in more detail below, including dequantizing the quantized transform coefficients at dequantization stage 80 and inverse transforming the dequantized transform coefficients at inverse transform stage 82 to produce a derivative residual block (derivative residual). At reconstruction stage 84, the prediction block that was predicted at intra/inter-prediction stage 72 can be added to the derivative residual to create a reconstructed block. Loop filtering stage 86 can be applied to the reconstructed block to reduce distortion such as blocking artifacts.

Other variations of encoder 70 can be used to encode compressed bitstream 88. For example, a non-transform based encoder 70 can quantize the residual block directly without transform stage 74. In another implementation, an encoder 70 can have quantization stage 76 and dequantization stage 80 combined into a single stage.

Figure 4:
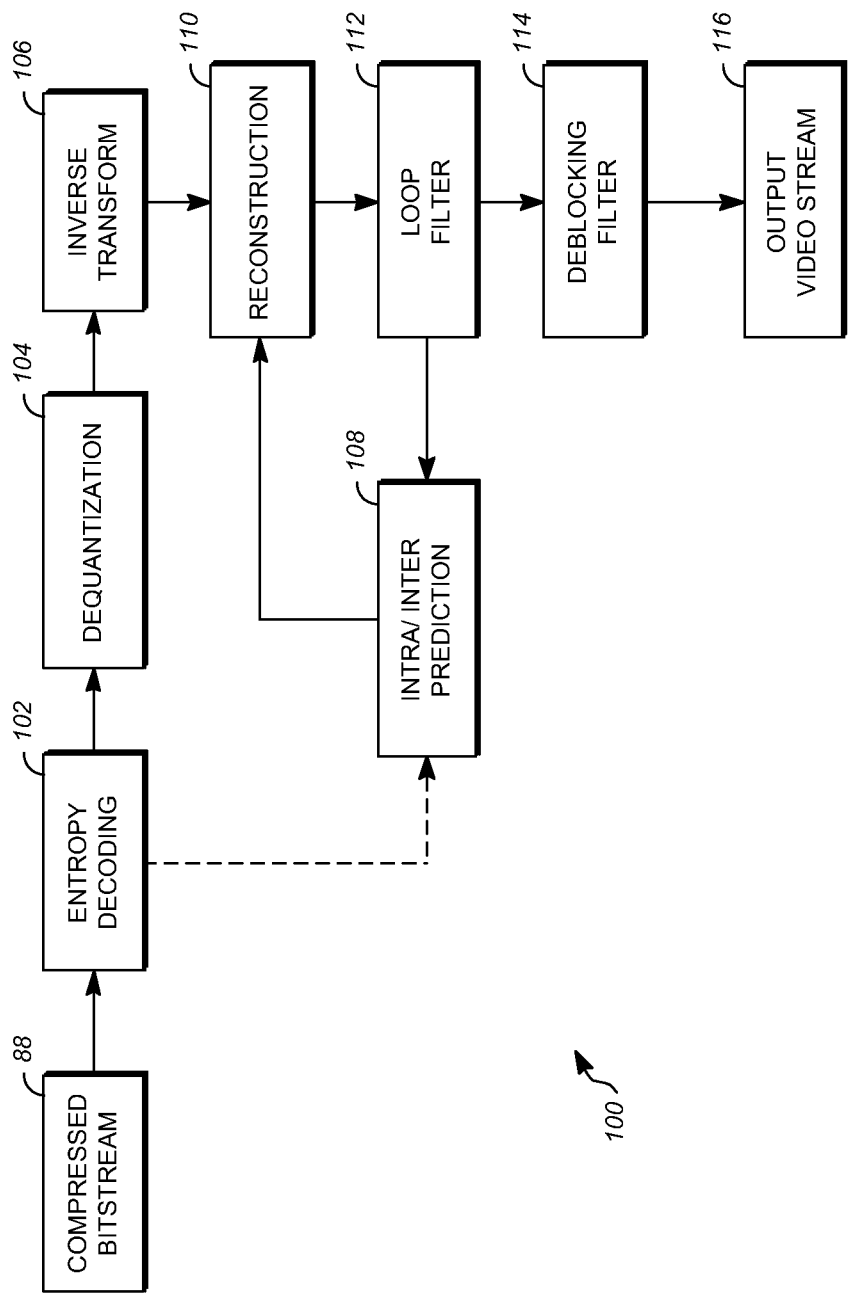
FIG. 4 is a block diagram of a video decompression system in accordance with=implementations of this disclosure.

FIG. 4 is a block diagram of a decoder 100 in accordance with another implementation. Decoder 100 can be implemented, for example, in receiving station 30, such as by providing a computer software program stored in memory for example. The computer software program can include machine instructions that, when executed by CPU 32, cause receiving station 30 to decode video data in the manner described in FIG. 4. Decoder 100 can also be implemented as specialized hardware included, for example, in transmitting station 12 or receiving station 30.

Decoder 100, similar to the reconstruction path of encoder 70 discussed above, includes in one example the following stages to perform various functions to produce an output video stream 116 from compressed bitstream 88: an entropy decoding stage 102, a dequantization stage 104, an inverse transform stage 106, an intra/inter-prediction stage 108, a reconstruction stage 110, a loop filtering stage 112, and a deblocking filtering stage 114. Other structural variations of decoder 100 can be used to decode compressed bitstream 88.

When compressed bitstream 88 is presented for decoding, the data elements within compressed bitstream 88 can be decoded by the entropy decoding stage 102 (using, for example, Context Adaptive Binary Arithmetic Decoding) to produce a set of quantized transform coefficients. Dequantization stage 104 dequantizes the quantized transform coefficients, and inverse transform stage 106 inverse transforms the dequantized transform coefficients to produce a derivative residual that can be identical to that created by inverse transform stage 82 in encoder 70. Using header information decoded from compressed bitstream 88, decoder 100 can use intra/inter-prediction stage 108 to create the same prediction block as was created in encoder 70, e.g., at intra/inter-prediction stage 72. At reconstruction stage 110, the prediction block can be added to the derivative residual to create a reconstructed block. Loop filtering stage 112 can be applied to the reconstructed block to reduce blocking artifacts. Deblocking filtering stage 114 can be applied to the reconstructed block to reduce blocking distortion. Output video stream 116 can also be referred to as a decoded video stream and the terms will be used interchangeably herein.

Other variations of decoder 100 can be used to decode compressed bitstream 88. For example, decoder 100 can produce output video stream 116 without deblocking filtering stage 114.

Figure 5:
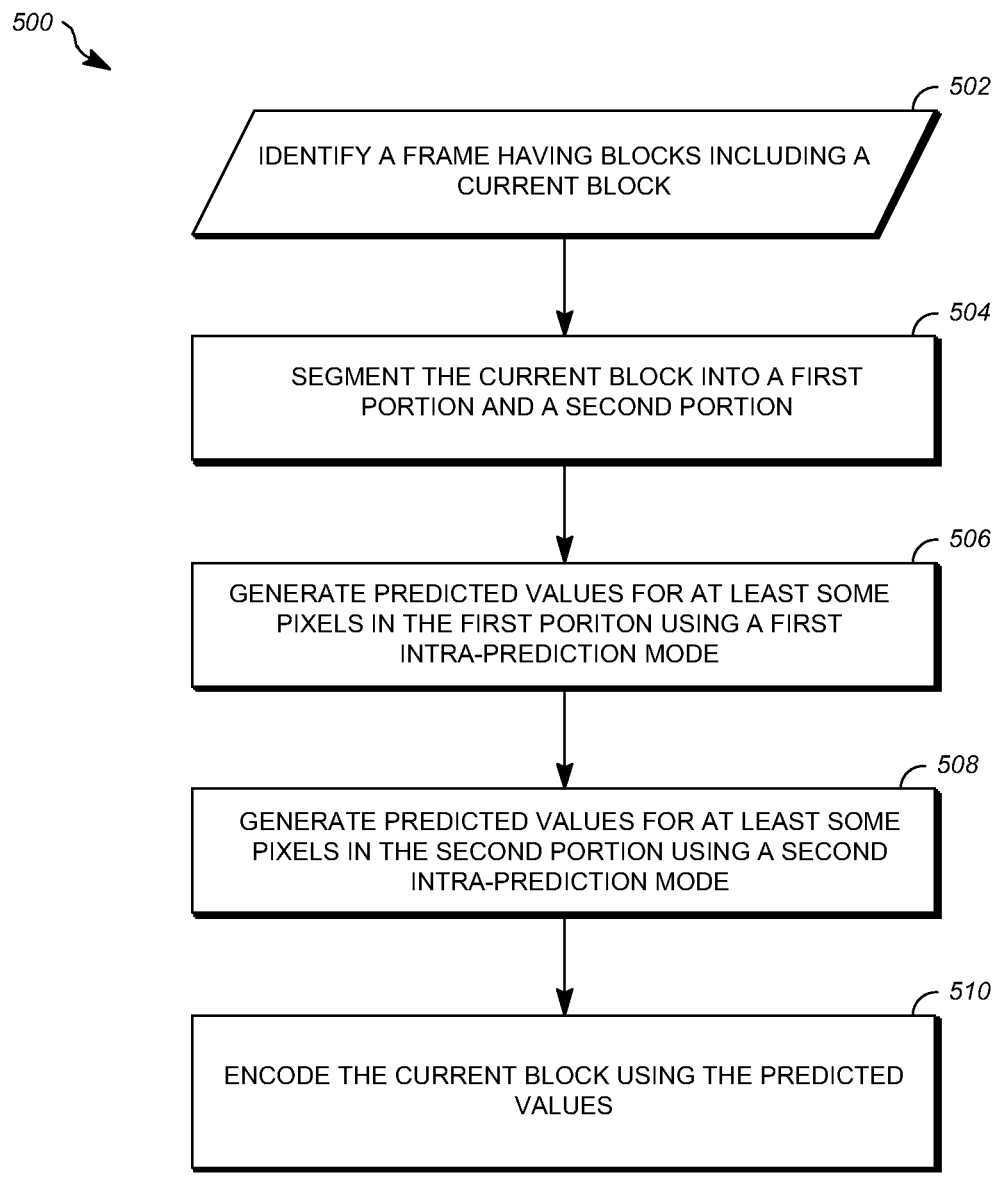
FIG. 5 is a flow diagram of an example method of operation for encoding a video stream using object-based intra-prediction in accordance with implementations of this disclosure.

FIG. 5 is a flow diagram of an example method of operation 500 for encoding a video stream using object-based intra-prediction in accordance with implementations of this disclosure. Method of operation 500 can be implemented in an encoder, such as encoder 70, as a software program that can be executed by a computing device, such as transmitting station 12 or receiving station 30. For example, the software program can include machine-readable instructions stored in a memory, such as memory 16 or memory 34, that may be executed by a processor, such as CPU 14, to perform method of operation 500. In an implementation, method of operation 500 can be implemented using specialized hardware or firmware.

Implementations of method of operation 500 can include identifying a frame of video data including a current block at 502, segmenting the current block into a first portion and a second portion at 504, generating predicted values for at least some of the pixels in the first portion using a first intra-prediction mode at 506, generating predicted values for at least some of the pixels in the second portion using a second intra-prediction mode at 508, and encoding the current block using the predicted values at 510.

A portion, such as a current block, of an input video signal, such as input video stream 50 shown in FIG. 3, may be identified at 502. For example, as shown in FIG. 2, an input video signal may include frames and each frame may include blocks. As shown in FIGS. 7-22, a block may include a 4x4 group of pixels, which may be expressed as a 4×4 matrix. Although FIGS. 7-22 show 4×4 blocks of pixels, any size block may be used.

The current block can be segmented into portions (objects) based on correlation between pixel values at 504. For example, the current block may be segmented into a first portion including a first set of correlated pixels and a second portion including a second set of correlated pixels. Each portion can have any shape or form, such as an L-shape, an inverse L-shape, a rectangular shape, a square shape, a diagonal shape, a triangular shape, or any other shape capable of including correlated pixel data.

In some implementations, the segmentation may correspond with objects captured in the video scene. For example, the video scene may capture a picture frame hanging on a wall. The current block may include a corner of the picture frame and part of the wall. The current block may be segmented into a first portion, which may be an L-shape portion, corresponding to the corner of the picture frame, and a second portion, which may be a square portion, corresponding to the wall. Although FIGS. 7-22 show examples of segmenting a block into two portions, any number of portions may be used.

Predicted values for at least some of the pixels in the first portion may be generated using a first intra-prediction mode at 506, and predicted values for at least some of the pixels in the second portion may be generated using a second intra-prediction mode at 508. Generating predicted values may include identifying a prediction mode for each respective portion. The prediction modes may be identified to efficiently predict the pixels in the respective portion. For example, a prediction mode for a portion may be identified to minimize coding bits in a residual block. The prediction modes may be identified independently. For example, the first intra-prediction mode may be an object-based prediction mode, such as the object-based prediction modes shown in FIGS. 7-22, and the second intra-prediction mode may be a directional prediction mode, such as horizontal or vertical prediction.

In some implementations, more than one prediction mode may be used to predict a portion. For example, the first portion may be an L-shaped portion, some pixels in the first portion may be predicted using horizontal prediction and other pixels in the first portion may be predicted using vertical prediction.

In some implementations, the first and second intra-prediction modes can be combined into a combined prediction mode. For example, as shown in FIG. 16, a combined prediction mode can include predicting the left-most column of the current block with the pixels immediately to the left of the current block and predicting the rest of the current block with the pixels immediately above the current block.

The current block can be encoded using the predicted values at 510. Encoding the current block can include generating a prediction block based on the predicted values associated with the first portion and the predicted values associated with the second portion, and generating a residual block based on the current block and the prediction block. The residual block can be transformed, quantized, entropy coded, and can be included in an encoded video stream.

Other implementations of method of operation 500 as shown in FIG. 5 are available. In implementations, additional elements of method of operation 500 can be added, certain elements can be combined, and/or certain elements can be removed. For example, in an implementation, the segmentation shown at 504 may be performed concurrently with generating the predicted values shown at 506 and 508. In another example, a combined prediction mode may be used and the segmentation shown at 504 may be omitted.

FIG. 6 is a diagram of an example of a block using intra-prediction in accordance with implementations of this disclosure. The current block may include a group of pixels that can be represented by a 4×4 matrix Dblk, such that Dblk(i,j) indicates the pixel value for data element (i,j) in matrix Dblk, and may be expressed as the following:

$$Dblk=[Dblk(i,j)], i=0,1,2,3; j=0,1,2,3. \quad \text{[Equation 1]}$$

A prediction block of the current block can be represented by a 4×4 matrix Pblk, such that Pblk(i,j) indicates the predicted pixel value for data element (i,j), and may be expressed as the following:

$$Pblk=[Pblk(i,j)], i=0,1,2,3; j=0,1,2,3. \quad \text{[Equation 2]}$$

A residual block can be represented by a 4x4 residual error matrix Rblk such that Rblk(i,j) indicates the residual error value for data element (i,j), and may be expressed as the following as the following:

$$Rblk=[Rblk(i,j)]=[Dblk(i,j)-Pblk(i,j)], i=0,1,2,3; j=0,1,2,3; \quad \text{[Equation 3]}$$

The residual error value may indicate a difference of pixel values between the current block Dblk(i,j) and the prediction block Pblk(i,j).

In some encoding schemes, such as the schemes that use raster scanned coding, data available for use during intra-prediction can include data in prior-coded blocks in the frame. The prior-coded blocks used for intra-prediction can include, for example, blocks in rows above the current block and blocks to the left of the current block in the same row. For simplicity, FIGS. 7-22 show using data in the row immediately above and immediately left of the current block. In other implementations, data from rows or columns not immediately adjacent to the current block, including data from blocks that are not adjacent to the current block, can be used for intra-prediction.

An array T of 8 pixels can represent the data in a row immediately above the current block, and can be expressed as T=[Ti], i=0,1, . . . 7. An array L of 4 pixels can represent the data in a column immediately left of the current block and can be expressed as L=[Lj], j=0,1,2,3.

The pixel above and to the left of the current block may be referred to as Dtlc. Data in array T, array L, and Dtlc can be used for intra-prediction of the current block represented by matrix Dblk.

FIGS. 7-22 show examples of segmenting a current block into portions and corresponding prediction blocks. As shown in FIGS. 7-22, a current block may be segmented into a first porting and a second portion. For clarity, FIGS. 7-22 indicate pixels in the first portion with an X and pixels in the second portion with an O. Although not shown in FIGS. 7-22, a block may be segmented into any number of portions in any arrangement. Other segmentation or prediction schemes not shown or described herein can be used.

FIG. 7A shows an example of L-shaped segmentation (type-1) and FIG. 7B shows an example of a corresponding prediction block. As shown in FIG. 7A, the current block may be segmented into a first portion that is formed by the left-most column and the bottom row of the block and a second portion that is formed by the remaining pixels in the block.

As shown in FIG. 7B, the first portion can be predicted using data to the left of the current block and the second portion can be predicted by data above the current block. Generating prediction block Pblk can be expressed as the following:

$$Pblk(0,j)=Lj, j=0,1,2,3;$$

$$Pblk(i,3)=L3, i=1,2,3;$$

$$Pblk(i,j)=Ti, i=1,2,3; j=0,1,2. \quad \text{[Equation 4]}$$

FIG. 8A shows another example of L-shaped segmentation (type-2) and FIG. 8B shows a corresponding prediction block. As shown in FIG. 8A, the current block may be segmented into a first portion that is formed by the two left-most columns and the two bottom rows of pixels in the block, and the second portion is formed by the remaining pixels in the block.

As shown in FIG. 8B, the first portion can be predicted by data to the left of the current block and the second portion can be predicted by data above the current block. Generating the prediction block Pblk can expressed as the following:

$$Pblk(i,j)=Lj, i=0,1; j=0,1,2,3;$$

$$Pblk(i,j)=Lj, i=2,3; j=2,3;$$

$$Pblk(i,j)=Ti, i=2,3; j=0,1. \quad \text{[Equation 5]}$$

FIG. 9A shows an example of inverse-L-shaped segmentation (type-3) and FIG. 9B shows an example of a corresponding prediction block. As shown in FIG. 9A, the current block may be segmented into a first portion that is formed by the right-most column and the top row of the block and a second portion that is formed by the remaining pixels in the block.

As shown in FIG. 9B, the first portion can be predicted using data above the current block and the second portion can be predicted by data to the left of the current block. Generating prediction block Pblk can be expressed as the following:

$$Pblk(i,0)=Ti, j=0,1,2,3;$$

$$Pblk(3,j)=T3, j=1,2,3;$$

$$Pblk(i,j)=Lj, i=0,1,2; j=1,2,3. \quad \text{[Equation 6]}$$

FIG. 10A shows another example of inverse-L-shaped segmentation (type-4) and FIG. 10B shows a corresponding prediction block. As shown in FIG. 10A, the current block may be segmented into a first portion that is formed by the two right-most columns and the two top rows of pixels in the block, and the second portion is formed by the remaining pixels in the block.

As shown in FIG. 10B, the first portion can be predicted by data above the current block and the second portion can be predicted by data to the left of the current block. Generating the prediction block Pblk can expressed as the following:

$$Pblk(i,j)=Ti, i=0,1,2,3; j=0,1;$$

$$Pblk(i,j)=Ti, i=2,3; j=2,3;$$

$$Pblk(i,j)=Lj, i=0,1; j=2,3. \quad \text{[Equation 7]}$$

FIG. 11A shows another example of inverse-L-shaped segmentation (type-5) and FIG. 11B shows an example of a corresponding prediction block. As shown in FIG. 11A, the current block may be segmented into a first portion that is formed by the left-most column and the top row of the block and a second portion that is formed by the remaining pixels in the block.

As shown in FIG. 11B, the first portion can be predicted using a combination of data above the current block and data to the left of the current block, and the second portion can be predicted using data in the row above the current block. In an implementation, as shown in FIG. 11B, the second portion can be predicted using an average of two or more pixels in the row above the current block. Generating prediction block Pblk can be expressed as the following:

$$Pblk(i,0)=Ti, i=0,1,2,3;$$

$$Pblk(0,j)=Lj, j=1,2,3;$$

$$Pblk(i,j)=(T6+T7)/2, i=1,2,3; j=1,2,3. \quad \text{[Equation 8]}$$

Figures 12A, 12B:
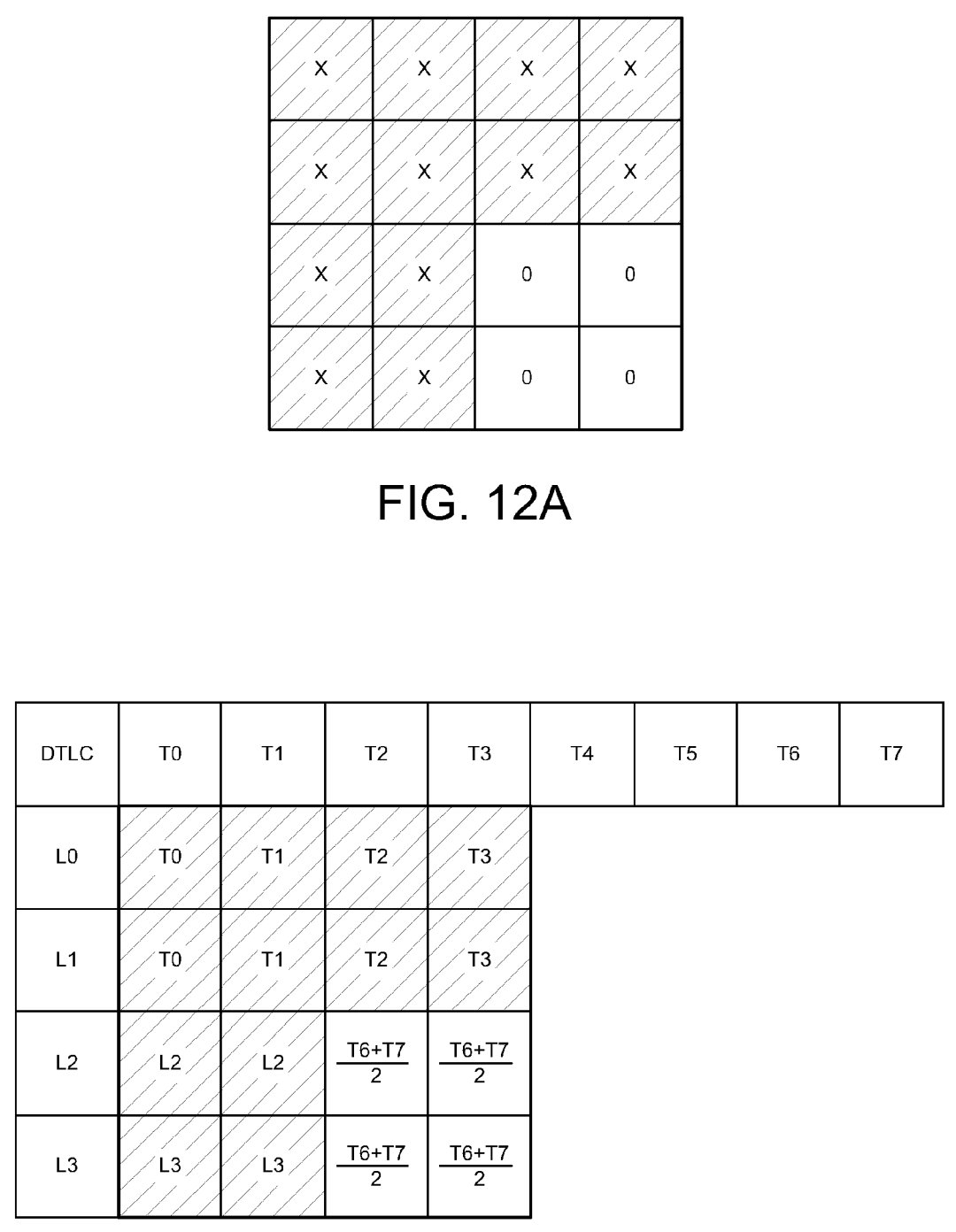

FIG. 12A shows another example of inverse-L-shaped segmentation (type-6) and FIG. 12B shows an example of a corresponding prediction block. As shown in FIG. 12A, the current block may be segmented into a first portion that is formed by the two left-most columns and the two top rows of the block and a second portion that is formed by the remaining pixels in the block.

As shown in FIG. 12B, the first portion can be predicted using a combination of data above the current block and data to the left of the current block, and the second portion can be predicted using data in the row above the current block. In an implementation, as shown in FIG. 12B, the second portion can be predicted using an average of two or more pixels in the row above the current block. Generating prediction block Pblk can be expressed as the following:

$$Pblk(i,j)=Ti, i=0,1,2,3; j=0,1;$$

$$Pblk(i,j)=Lj, i=0,1; j=2,3;$$

$$Pblk(i,j)=(T6+T7)/2, 1=2,3; j=2,3. \quad \text{[Equation 9]}$$

FIG. 13A shows another example of L-shaped segmentation (type-7) and FIG. 13B shows an example of a corresponding prediction block. As shown in FIG. 13A, the current block may be segmented into a first portion that is formed by the right-most column and the bottom row of the block and a second portion that is formed by the remaining pixels in the block.

As shown in FIG. 13B, the first portion can be predicted using a combination of data above the current block and data to the left of the current block, and the second portion can be predicted using a combination of data in the row above the current block and data to the left of the current block. In an implementation, as shown in FIG. 13B, the second portion can be predicted using an average of a pixel in the row above the current block and a pixel to the left of the current block. Generating prediction block Pblk can be expressed as the following:

$$Pblk(i,j)=(Ti+Lj)/2, i=0,1,2; j=0,1,2;$$

$$Pblk(3,j)=T3, j=0,1,2,3;$$

$$Pblk(i,3)=L3, i=0,1,2. \qquad \text{[Equation 10]}$$

FIG. 14A shows another example of L-shaped segmentation (type-8) and FIG. 14B shows an example of a corresponding prediction block. As shown in FIG. 14A, the current block may be segmented into a first portion that is formed by the two right-most columns and the two bottom rows of the block and a second portion that is formed by the remaining pixels in the block.

As shown in FIG. 14B, the first portion can be predicted using a combination of data above the current block and data to the left of the current block, and the second portion can be predicted using a combination of data in the row above the current block and data to the left of the current block. In an implementation, as shown in FIG. 14B, the second portion can be predicted using an average of a pixel in the row above the current block and a pixel to the left of the current block. Generating prediction block Pblk can be expressed as the following:

$$Pblk(i,j)=(Ti+Lj)/2, i=0,1; j=0,1;$$

$$Pblk(i,j)=Ti, i=2,3; j=0,1,2,3;$$

$$Pblk(i,j)=Lj, i=0,1; j=2,3. \qquad \text{[Equation 11]}$$

Figures 15A, 15B:
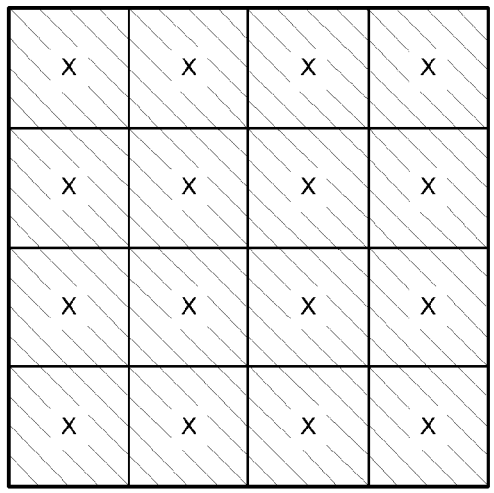

FIG. 15A shows an example of vertical segmentation (type-9) and FIG. This implementation may generate a prediction block that corresponds with vertical prediction. 15B shows an example of a corresponding prediction block. As shown in FIG. 15A, the current block may be segmented into a single portion. Although not shown in FIG. 15A, the current block may be segmented into multiple horizontal or vertical portions.

As shown in FIG. 15B, the portion can be predicted using data above the current block. Generating prediction block Pblk can be expressed as the following:

$$Pblk(i,j)=Ti, i=0,1,2,3; j=0,1,2,3. \qquad \text{[Equation 12]}$$

FIG. 16A shows an example of vertical segmentation (type-10) and FIG. 16B shows an example of a corresponding prediction block. As shown in FIG. 16A, the current block may be segmented into a first portion that is formed by the left-most column of pixels in the block and a second portion that is formed by the remaining pixels in the block.

As shown in FIG. 16B, the first portion can be predicted using data to the left of the current block, and the second portion can be predicted using data in the row above the current block. Generating prediction block Pblk can be expressed as the following:

$$Pblk(i,j)=Ti, i=1,2,3; j=0,1,2,3;$$

$$Pblk(0,j)=Lj, j=0,1,2,3. \qquad \text{[Equation 13]}$$

FIG. 17A shows another example of vertical segmentation (type-11) and FIG. 17B shows an example of a corresponding prediction block. As shown in FIG. 17A, the current block may be segmented into a first portion that is formed by the two left-most columns of pixels in the block and a second portion that is formed by the remaining pixels in the block.

As shown in FIG. 17B, the first portion can be predicted using data to the left of the current block, and the second portion can be predicted using data in the row above the current block. Generating prediction block Pblk can be expressed as the following:

$$Pblk(i,j)=Ti, i=2,3; j=0,1,2,3;$$

$$Pblk(i,j)=Lj, i=0,1; j=0,1,2,3. \qquad \text{[Equation 14]}$$

FIG. 18A shows another example of vertical segmentation (type-12) and FIG. 18B shows an example of a corresponding prediction block. As shown in FIG. 18A, the current block may be segmented into a first portion that is formed by the three left-most columns of pixels in the block and a second portion that is formed by the remaining pixels in the block.

As shown in FIG. 18B, the first portion can be predicted using data to the left of the current block, and the second portion can be predicted using data in the row above the current block. Generating prediction block Pblk can be expressed as the following:

$$Pblk(3,j)=T3, j=0,1,2,3;$$

$$Pblk(i,j)=Lj, i=0,1,2; j=0,1,2,3. \qquad \text{[Equation 15]}$$

FIG. 19A shows an example of horizontal segmentation (type-13) and FIG. 19B shows an example of a corresponding prediction block. This implementation may generate a prediction block that corresponds with horizontal prediction. As shown in FIG. 19A, the current block may be segmented into a first portion that is formed by the three top-most rows of pixels in the block and a second portion that is formed by the remaining pixels in the block. Although not shown in FIG. 19A, the first portion may be formed by the top-most row of pixels in the block, or by the two top-most rows of pixels in the block. Although not shown in FIG. 19A, horizontal segmentation can include segmenting the current block into a single portion.

As shown in FIG. 19B, the first portion and the second portion can be predicted using data to the left of the current block. Generating prediction block Pblk can be expressed as the following:

$$Pblk(i,j)=Lj, i=0,1,2,3; j=0,1,2,3. \qquad \text{[Equation 16]}$$

Figures 20A, 20B:
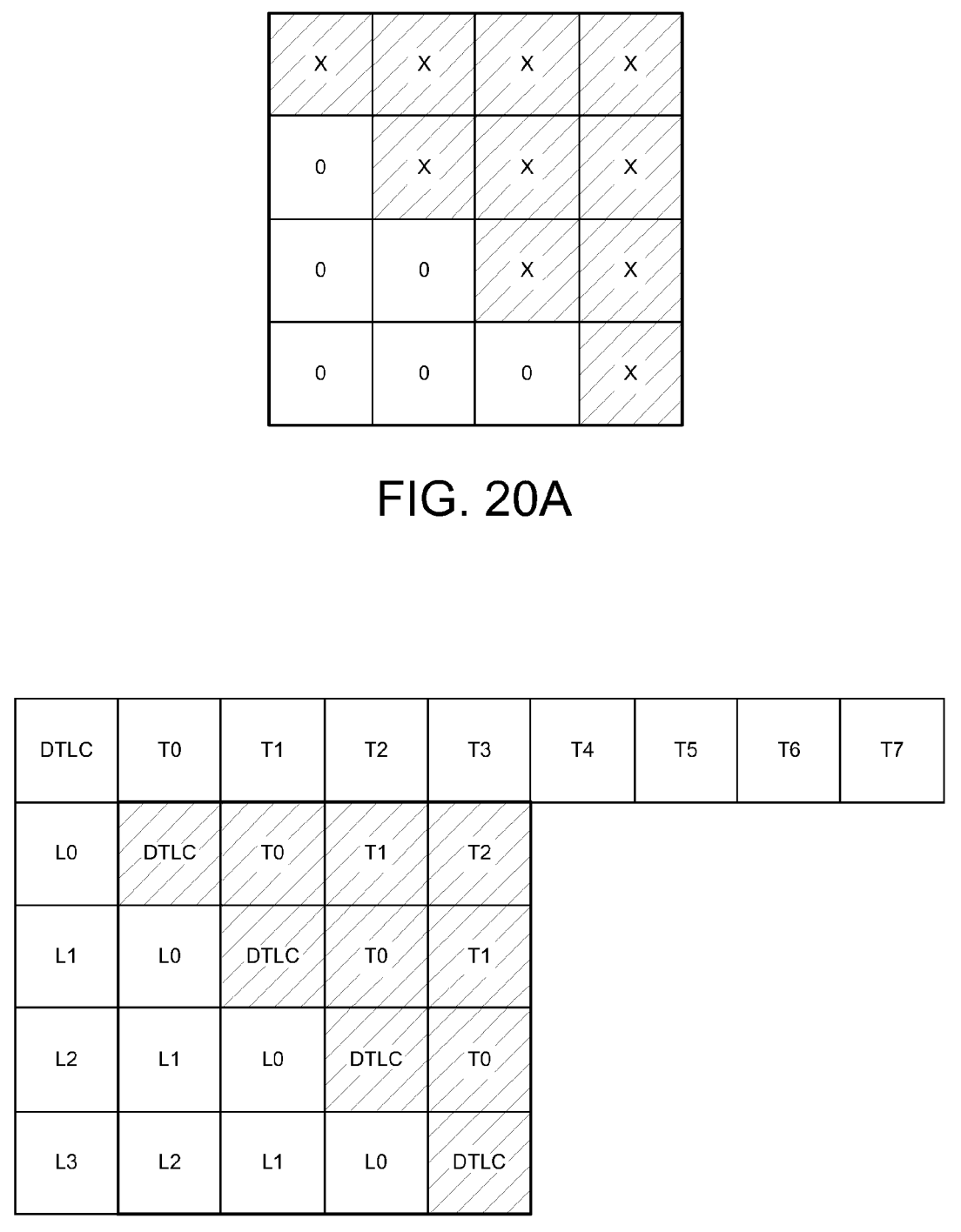

FIG. 20A shows an example of diagonal segmentation (type-14) and FIG. 20B shows an example of a corresponding prediction block. As shown in FIG. 20A, the current block may be segmented into a first portion and a second portion by diagonally segmenting the pixels in the current block from the top-left to the bottom-right.

As shown in FIG. 20B, the first portion can be predicted using data above the current block, the second portion can be predicted using data to the left of the current block, and pixels along the diagonal can be predicted using the pixel to the top-left of the current block (Dtlc). Generating prediction block Pblk can be expressed as the following:

$$Pblk(x,x)=Dtlc, x=0,1,2,3;$$

$$Pblk(x+1,x)=T0, x=0,1,2;$$

$$Pblk(x+2,x)=T1, x=0,1;$$

$$Pblk((x+3,x)=T2, x=0;$$

$$Pblk(x,x+1)=L0, x=0,1,2;$$

$$Pblk(x,x+2)=L1, x=0,1;$$

$$Pblk((x,x+3)=L2, x=0. \qquad \text{[Equation 17]}$$

FIG. 21A shows another example of diagonal segmentation (type-15) and FIG. 21B shows an example of a corresponding prediction block. As shown in FIG. 21A, the current block may be segmented into a first portion and a second portion by diagonally segmenting the pixels in the current block from the top-right to the bottom-left.

As shown in FIG. 21B, the first portion can be predicted using a combination of data above the current block and data to the left of the current block, and the second portion can be predicted using data in the row above the current block. As shown in FIG. 21B, some pixels in the first portion may be predicted using data above the current block, some pixels may be predicted using data to the left of the current block, and some pixels may be generated using an average of a pixel above the current block and a pixel to the left of the current block. Generating prediction block Pblk can be partially expressed as the following:

$$Pblk(0,0)=(T1+L1)/2;$$

$$Pblk(x,0)=T(x+1), x=1,2,3;$$

$$Pblk(0,y)=L(y+1), y=1,2;$$

$$Pblk(1,1)=(T3+L3)/2;$$

$$Pblk(3,1)=Pblk(2,2)=Pblk(1,3)=T5;$$

$$Pblk(3,2)=Pblk(2,3)=T6;$$

$$Pblk(3,3)=T7. \hspace{2em} \text{[Equation 18]}$$

The pixels along the diagonal may be predicted using a weighted average of pixels in the row above the current block and a predicted pixel below LP4 below and to the left of the current block. The predicted pixel LP4 may be an estimate of an unencoded (or unscanned) pixel to the left of and below the bottom right corner of the current block, and may be expressed as the following:

$$LP4=L3+(L3-L2). \hspace{2em} \text{[Equation 19]}$$

Although a pixel to the left of the current block, such as L3, may be used for predicting the pixels on the diagonal, using LP4 may produce more accurate predictions. Accordingly, predicting the pixels along the diagonal of the current block can be expressed as the following:

$$Pblk(3,0)=T4;$$

$$Pblk(2,1)=0.25*LP4+0.75*T4;$$

$$Pblk(1,2)=0.5*LP4+0.5*T4;$$

$$Pblk(0,3)=0.75*LP4+0.25*T4. \hspace{2em} \text{[Equation 20]}$$

FIG. 22A shows an example of diagonal-mirror segmentation (type-16) and FIG. 22B shows an example of a corresponding prediction block. As shown in FIG. 22A, the current block may be segmented into a first portion and a second portion by diagonally segmenting the pixels in the current block from the top-right to the bottom-left.

As shown in FIG. 22B, the first portion can be predicted using a combination of data above the current block and data to the left of the current block, and the second portion can be predicted using data in the row above the current block. As shown in FIG. 22B, some pixels in the first portion may be predicted using data above the current block, some pixels may be predicted using data to the left of the current block, and some pixels may be generated using an average of a pixel above the current block and a pixel to the left of the current block. The pixels in the second portion may be predicted based on a mirror of the pixels in the first portion. Generating prediction block Pblk can be expressed as the following:

$$Pblk(0,0)=(T1+L1)/2;$$

$$Pblk(x,0)=T(x+1), x=1,2,3;$$

$$Pblk(0,y)=L(y+1), y=1,2;$$

$$Pblk(0,3)=Pblk(1,2)=Pblk(2,1)=(2*L3-L2+T4)/2;$$

$$Pblk(1,1)=(T3+L3)/2.$$

$$Pblk(3,1)=Pblk(2,0);$$

$$Pblk(2,2)=Pblk(1,1);$$

$$Pblk(1,3)=Pblk(0,2);$$

$$Pblk(3,2)=Pblk(1,0);$$

$$Pblk(2,3)=Pblk(0,1);$$

$$Pblk(3,3)=Pblk(0,0). \hspace{2em} \text{[Equation 21]}$$

FIGS. 7-22 show blocks of 4×4 pixels for simplicity. However, any other block sizes can be used. For example, a block can be divided into more than two portions, each of which can use any of the prediction techniques described above. The intra-prediction techniques described in FIGS. 7-22 can also be combined with other prediction techniques. For example, portions that exhibit directional features can be predicted using directional prediction techniques, while the other portions can use the techniques described in FIGS. 7-22.

Figure 23:
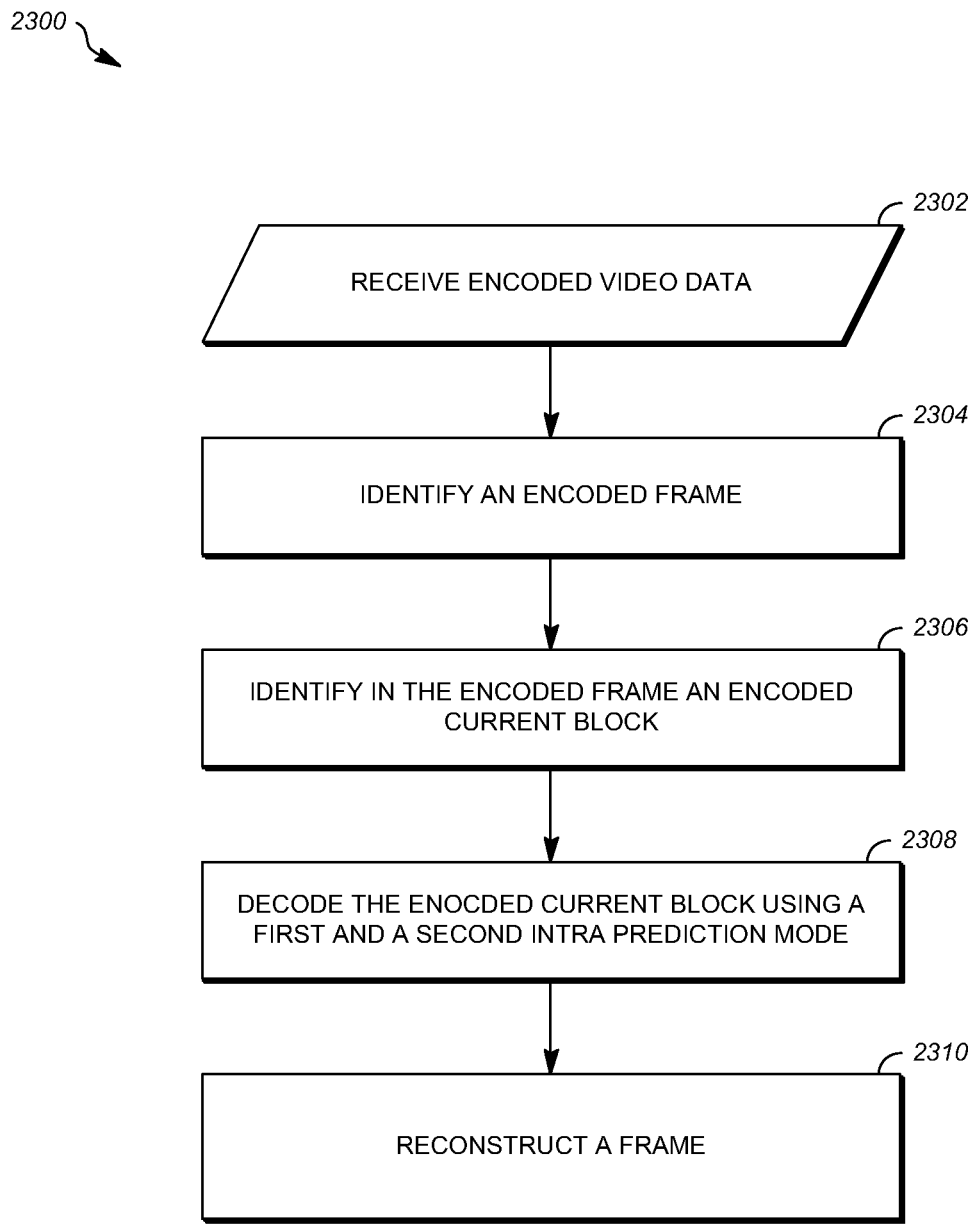
FIG. 23 is a flow diagram of an example method of operation for decoding a video stream using object-based intra-prediction in accordance with implementations of this disclosure.

FIG. 23 is a flow diagram of an example method of operation for decoding a video stream using object-based intra-prediction in accordance with implementations of this disclosure. Method of operation 2300 can be implemented in a decoder, such as decoder 100 shown in FIG. 4, as a software program that can be executed by computing devices, such as transmitting station 12 or receiving station 30. For example, the software program can include machine-readable instructions stored in a memory, such as memory 16 or 34, that may be executed by a processor, such as CPU 14 or 32, to perform method of operation 2300. In an implementation, method of operation 2300 can be implemented using specialized hardware or firmware.

Implementations of method of operation 2300 can include receiving an encoded video stream at 2302, identifying an encoded frame at 2304, identifying an encoded current block in the encoded frame at 2306, decoding the encoded current block using at least a first and a second intra-prediction mode at 2308, and reconstructing a frame at 2310.

An encoded video data, such as compressed bitstream 88 shown in FIG. 4, may be received at 2302. For example, a computing device, such as receiving station 30, may receive the encoded video data. The encoded video data can be received by receiving the video data over a wireless or wired network, or by reading the video data from a memory or other storage device, such as a disk drive or removable media such as a DVD, CompactFlash (CF) card, Secure Digital or (SD) card, or via any means of communicating encoded video data.

An encoded frame can be identified in the encoded video data at 2304. The term "identify" includes select, construct, determine, specify, or otherwise identify in any manner whatsoever.

An encoded current block can be identified from the encoded frame at 2306. The encoded current block can be, for example, a block encoded using any of the prediction modes described above, such as a directional intra-prediction mode, an object-based intra-prediction mode, or a combination of directional and object-based intra-prediction modes. The current block may include a first portion encoded using a first intra-prediction mode, and a second portion encoded using a second intra-prediction mode.

A decoded current block can be generated at 2308. For example, generating a decoded current block can include decoding the encoded current block include using a first intra-prediction mode and a second intra-prediction mode. In some implementations, the encoded current block may be encoded using combined prediction mode.

Decoding the encoded current block may be similar to encoding the current block as described above. For example, decoding the encoded current block can include identifying the first portion and the second portion of the encoded current block, identifying the first intra-prediction mode and the second intra-prediction mode, and using the identified intra-prediction modes to predict pixels in the decoded current block.

A frame can be reconstructed based on the decoded current block at 2310. The frame can be reconstructed from the decoded current block using decoding stages such as reconstruction stage 110, loop filtering stage 112, and deblocking filtering stage 114 shown in FIG. 4. The output can be, for example, output video stream 116, also referred to as decoded video stream.

Method of operation 2300 is depicted and described as a series of steps. However, steps in accordance with this disclosure can occur in various orders and/or concurrently. Additionally, steps in accordance with this disclosure may occur with other steps not presented and described herein. Furthermore, not all illustrated steps may be required to implement a method in accordance with the disclosed subject matter.

The implementations or implementations of encoding and decoding described above illustrate some exemplary encoding and decoding techniques. However, it is to be understood that encoding and decoding, as those terms are used in the claims, could mean compression, decompression, transformation, or any other processing or change of data.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such.

A computing device implementing the techniques disclosed herein (and the algorithms, methods, instructions, etc. stored thereon and/or executed thereby) can be realized in hardware, software, or any combination thereof including, for example, IP cores, ASICS, programmable logic arrays, optical processors, programmable logic controllers, microcode, microcontrollers, servers, microprocessors, digital signal processors or any other suitable circuit or other information processing device, now existing or hereafter developed. In the claims, the term "processor" should be understood as encompassing any of the foregoing hardware, either singly or in combination. The terms "signal" and "data" are used interchangeably.

Further, in some implementations, for example, the techniques described herein can be implemented using a general purpose computer/processor with a computer program that, when executed, carries out any of the respective methods, algorithms and/or instructions described herein. In addition or alternatively, for example, a special purpose computer/processor can be utilized which can contain specialized hardware for carrying out any of the methods, algorithms, or instructions described herein.

In some implementations, transmitting station 12 and receiving stations 30, 40 can, for example, be implemented on computers in a screencasting system. Alternatively, transmitting station 12 can be implemented on a server and receiving station 30 or 40 can be implemented on a device separate from the server, such as a hand-held communications device (i.e. a cell phone). In this instance, transmitting station 12 can encode content using an encoder 70 into an encoded video signal and transmit the encoded video signal to the communications device. In turn, the communications device can then decode the encoded video signal using a decoder 100. Alternatively, the communications device can decode content stored locally on the communications device, i.e. content that was not transmitted by transmitting station 12. Other suitable transmitting station 12 and receiving stations 30, 40 implementation schemes are available. For example, receiving station 30 or 40 can be a generally stationary personal computer rather than a portable communications device and/or a device including an encoder 70 may also include a decoder 100.

Further, all or a portion of implementations of the present invention can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for encoding a frame in a video stream, the frame having a plurality of blocks including a current block, comprising:

segmenting, by a processor in response to instructions stored on a non-transitory computer readable medium, the current block into a first portion and at least a second portion, such that the first portion corresponds to a first object represented in the current block and the second portion corresponds to a second object represented in the current block;

generating, for at least some of a plurality of pixels in the first portion, corresponding predicted values according to at least a first intra-prediction mode;

generating, for at least some of a plurality of pixels in the second portion, corresponding predicted values according to at least a second intra-prediction mode; and encoding the current block using the predicted values corresponding to the first portion and the predicted values corresponding to the second portion.

2. The method of claim 1, wherein segmenting the current block into the first portion and the second portion comprises segmenting the current block into the first portion, the second portion and at least a third portion.

3. The method of claim 1, wherein the current block is segmented into the first portion and the at least the second portion by one of the following divisions: L-shaped, inverse L-shaped, bottom-left diagonal, or top-right diagonal.

4. The method of claim 1, wherein encoding the current block using the predicted values corresponding to the first portion comprises:
using at least one predicted value predicted according to the first intra-prediction mode and at least one predicted value predicted according to a third intra-prediction mode.

5. The method of claim 4, wherein encoding the current block using the predicted values corresponding to the second portion comprises:
using at least one predicted value predicted according to a fourth intra-prediction mode.

6. The method of claim 1, wherein the first intra-prediction mode is one of a vertical prediction mode, a horizontal prediction mode, a DC prediction mode, a true motion prediction mode, a diagonal-down-left prediction mode, a diagonal-down-right prediction mode, a vertical-right prediction mode, a horizontal-down prediction mode, a vertical-left prediction mode and a horizontal-up prediction mode.

7. The method of claim 1, wherein the second intra-prediction mode is one of a vertical prediction mode, a horizontal prediction mode, a DC prediction mode, a true motion prediction mode, a diagonal-down-left prediction mode, a diagonal-down-right prediction mode, a vertical-right prediction mode, a horizontal-down prediction mode, a vertical-left prediction mode and a horizontal-up prediction mode.

8. The method of claim 1, further comprising:
determining, for at least one pixel in at least one unencoded block, an estimated prediction value based on a prior-encoded block; and
generating, for at least some of the plurality of pixels in the first portion, corresponding predicted values based on the estimated prediction value.

9. The method of claim 1, wherein the current block is at least one of a 4×4 block of pixels or a 8×8 block of pixels.

10. The method of claim 1, wherein generating corresponding predicted values according to the first intra-prediction mode includes identifying the first intra-prediction mode based on a location of the first plurality of pixels in the current block, and generating corresponding predicted values according to the second intra-prediction mode includes identifying the second intra-prediction mode based on a location of the second plurality of pixels in the current block.

11. The method of claim 8, wherein the current block omits the unencoded block.

12. A method comprising:
segmenting, by a processor in response to instructions stored on a non-transitory computer readable medium, a current block of a current frame of an input video stream into a first portion and a second portion, wherein the first portion includes a first plurality of pixels and the second portion includes a second plurality of pixels;

identifying a first intra-prediction mode based on a location of the first plurality of pixels in the current block;
generating, for at least some of a plurality of pixels in the first portion, corresponding predicted values according to the first intra-prediction mode;
identifying a second intra-prediction mode based on a location of the second plurality of pixels in the current block;
generating, for at least some of a plurality of pixels in the second portion, corresponding predicted values according to the second intra-prediction mode; and
encoding the current block using the predicted values corresponding to the first portion and the predicted values corresponding to the second portion.

13. The method of claim 12, wherein the current block includes at least a first column, a second column, a third column, and a fourth column, the first column along a left edge of the current block, the second column immediately adjacent to the first column, the fourth column along a right edge of the current block, and the third column immediately adjacent to the fourth column, and wherein the current block includes at least a first row, a second row, a third row, and a fourth row, the first row along a top edge of the current block, the second row immediately adjacent to the first row, the fourth row along a bottom edge of the current block, and the third row immediately adjacent to the fourth row.

14. The method of claim 13, wherein segmenting the current block includes:
segmenting the current block such that the location of the first plurality of pixels in the current block includes the first column and the fourth row and the location of the second plurality of pixels in the current block omits the first column and the fourth row, wherein identifying the first intra-prediction mode based on the location of the first plurality of pixels in the current block includes identifying horizontal prediction as the first intra-prediction mode, and wherein identifying the second intra-prediction mode based on the location of the second plurality of pixels in the current block includes identifying vertical prediction as the second intra-prediction mode;
segmenting the current block such that the location of the first plurality of pixels in the current block includes the first column, the second column, the third row, and the fourth row, and the location of the second plurality of pixels in the current block omits the first column, the second column, the third row, and the fourth row, wherein identifying the first intra-prediction mode based on the location of the first plurality of pixels in the current block includes identifying horizontal prediction as the first intra-prediction mode, and wherein identifying the second intra-prediction mode based on the location of the second plurality of pixels in the current block includes identifying vertical prediction as the second intra-prediction mode;
segmenting the current block such that the location of the first plurality of pixels in the current block includes the fourth column and the first row and the location of the second plurality of pixels in the current block omits the fourth column and the first row, wherein identifying the first intra-prediction mode based on the location of the first plurality of pixels in the current block includes identifying vertical prediction as the first intra-prediction mode, and wherein identifying the second intra-prediction mode based on the location of the second plurality of pixels in the current block includes identifying horizontal prediction as the second intra-prediction mode;

segmenting the current block such that the location of the first plurality of pixels in the current block includes the third column, the fourth column, the first row, and the second row, and the location of the second plurality of pixels in the current block omits the third column, the fourth column, the first row, and the second row, wherein identifying the first intra-prediction mode based on the location of the first plurality of pixels in the current block includes identifying vertical prediction as the first intra-prediction mode, and wherein identifying the second intra-prediction mode based on the location of the second plurality of pixels in the current block includes identifying horizontal prediction as the second intra-prediction mode;

segmenting the current block such that the location of the first plurality of pixels in the current block includes the first column and the first row and the location of the second plurality of pixels in the current block omits the first column and the first row, wherein identifying the first intra-prediction mode based on the location of the first plurality of pixels in the current block includes identifying vertical prediction as the first intra-prediction mode for the first row, and identifying horizontal prediction as a third intra-prediction mode for pixels in the first column and rows other than the first row, and wherein identifying the second intra-prediction mode based on the location of the second plurality of pixels in the current block includes identifying an average of two previously encoded pixels above and to the right of the current block for predicting the second plurality of pixels;

segmenting the current block such that the location of the first plurality of pixels in the current block includes the first column, the second column, the first row, and the second row, and the location of the second plurality of pixels in the current block omits the first column, the second column, the first row, and the second row, wherein identifying the first intra-prediction mode based on the location of the first plurality of pixels in the current block includes identifying vertical prediction as the first intra-prediction mode for the first row and the second row, and identifying horizontal prediction as a third intra-prediction mode for pixels in the first column and the second column and rows other than the first row and the second row, and wherein identifying the second intra-prediction mode based on the location of the second plurality of pixels in the current block includes identifying an average of two previously encoded pixels above and to the right of the current block for predicting the second plurality of pixels;

segmenting the current block such that the location of the first plurality of pixels in the current block includes the fourth column and the fourth row and the location of the second plurality of pixels in the current block omits the fourth column and the fourth row, wherein identifying the first intra-prediction mode based on the location of the first plurality of pixels in the current block includes identifying vertical prediction as the first intra-prediction mode for the fourth column, and identifying horizontal prediction as a third intra-prediction mode for pixels in the fourth row and columns other than the fourth column, and wherein identifying the second intra-prediction mode based on the location of the second plurality of pixels in the current block includes identifying, for each current pixel in the second plurality of pixels, identifying an average of a respective first previously encoded pixel from a row above the current block and a respective second previously encoded pixel from a column to the left of the current block for predicting the respective current pixel, wherein a respective column of the respective first previously encoded pixel corresponds with a respective column of the respective current pixel and wherein a respective row of the respective second previously encoded corresponds with a respective row of the respective current pixel; or segmenting the current block such that the location of the first plurality of pixels in the current block includes the third column, the fourth column, the third row, and the fourth row, and the location of the second plurality of pixels in the current block omits the third column, the fourth column, the third row, and the fourth row, wherein identifying the first intra-prediction mode based on the location of the first plurality of pixels in the current block includes identifying vertical prediction as the first intra-prediction mode for the third column and the fourth column, and identifying horizontal prediction as a third intra-prediction mode for pixels in the third row and the fourth row and columns other than the third column and the fourth column, and wherein identifying the second intra-prediction mode based on the location of the second plurality of pixels in the current block includes identifying, for each current pixel in the second plurality of pixels, identifying an average of a respective first previously encoded pixel from a row above the current block and a respective second previously encoded pixel from a column to the left of the current block for predicting the respective current pixel, wherein a respective column of the respective first previously encoded pixel corresponds with a respective column of the respective current pixel and wherein a respective row of the respective second previously encoded corresponds with a respective row of the respective current pixel.

15. The method of claim 13, wherein segmenting the current block includes:

segmenting the current block such that the location of the first plurality of pixels in the current block includes the first column and the location of the second plurality of pixels in the current block omits the first column, wherein identifying the first intra-prediction mode based on the location of the first plurality of pixels in the current block includes identifying horizontal prediction as the first intra-prediction mode, and wherein identifying the second intra-prediction mode based on the location of the second plurality of pixels in the current block includes identifying vertical prediction as the second intra-prediction mode;

segmenting the current block such that the location of the first plurality of pixels in the current block includes the first column and the second column, and the location of the second plurality of pixels in the current block omits the first column and the second column, wherein identifying the first intra-prediction mode based on the location of the first plurality of pixels in the current block includes identifying horizontal prediction as the first intra-prediction mode, and wherein identifying the second intra-prediction mode based on the location of the second plurality of pixels in the current block includes identifying vertical prediction as the second intra-prediction mode; or segmenting the current block such that the location of the first plurality of pixels in the current block includes the first column, the second column, and the third column, and the location of the second plurality of pixels in the current block omits the first column, the second column, and the third column, wherein identifying the first intra-prediction mode based on the location of the first plurality of pixels in the current block includes identifying horizontal prediction as the first intra-prediction mode, and wherein identifying the second intra-prediction mode based on the location of the second plurality of pixels in the current block includes identifying vertical prediction as the second intra-prediction mode.

16. The method of claim 13, wherein:

segmenting the current block includes segmenting the current block such that:
- the location of the first plurality of pixels in the current block corresponds with a contiguous portion of the current block that includes the first row, at least three pixels from the second row, at least two pixels from the third row, at least one pixel from the fourth row, the first column, at least three pixels from the second column, at least two pixels from the third column, and at least one pixel from the fourth column, and
- the location of the second plurality of pixels in the current block corresponds with a contiguous portion of the current block that omits the first row, at least three pixels from the second row, at least two pixels from the third row, at least one pixel from the fourth row, the first column, at least three pixels from the second column, at least two pixels from the third column, and at least one pixel from the fourth column;

wherein identifying the first intra-prediction mode based on the location of the first plurality of pixels in the current block includes:
- identifying an average of an available encoded pixel above and to the right of a pixel in the first row and first column and an available encoded pixel below and to the left of the pixel in the first row and first column for predicting the pixel in the first row and first column,
- identifying an available encoded pixel above and to the right of a pixel in the first row and second column for predicting the pixel in the first row and second column,
- identifying an available encoded pixel above and to the right of a pixel in the first row and third column for predicting the pixel in the first row and third column,
- identifying an available encoded pixel above and to the right of the current block for predicting the pixel in the first row and fourth column,
- identifying an available encoded pixel below and to the left of a pixel in the second row and first column for predicting the pixel in the second row and first column,
- identifying an available encoded pixel below and to the left of a pixel in the third row and first column for predicting the pixel in the third row and first column,
- identifying a sum of the available encoded pixel above and to the right of the pixel in the first row and third column and the available encoded pixel below and to the left of the pixel in the third row and first column for predicting a pixel in the second row and second column,
- identifying a sum of three fourths of an available encoded pixel above and to the right of the current block and one fourth of a predicted encoded pixel below and to the left of the current block for predicting a pixel in the second row and third column,
- identifying a sum of one half of the available encoded pixel above and to the right of the current block and one half of the predicted encoded pixel below and to the left of the current block for predicting a pixel in the third row and second column, and
- identifying a sum of one fourth of the available encoded pixel above and to the right of the current block and three fourths of the predicted encoded pixel below and to the left of the current block for predicting a pixel in the fourth row and first column; and wherein identifying the second intra-prediction mode based on the location of the second plurality of pixels in the current block includes:
- identifying an available encoded pixel diagonally above and to the right of a pixel in the fourth column and second row for predicting the pixel in the fourth column and second row, a pixel in the third column and third row, and a pixel in the second column and fourth row,
- identifying an available encoded pixel diagonally above and to the right of a pixel in the fourth column and third row for predicting the pixel in the fourth column and third row, and a pixel in the third column and fourth row, and
- identifying an available encoded pixel diagonally above and to the right of a pixel in the fourth column and fourth row for predicting the pixel in the fourth column and fourth row.

17. The method of claim 12, further comprising:
- determining, for at least one pixel in at least one unencoded block other than the current block, an estimated prediction value based on a prior-encoded block; and
- generating, for at least some of the plurality of pixels in the first portion, corresponding predicted values based on the estimated prediction value.

18. The method of claim 12, wherein segmenting the current block is independent of scan order.

19. A method comprising:
- identifying, by a processor in response to instructions stored on a non-transitory computer readable medium, a segmentation for segmenting a current block of a current frame of an input video stream into a first portion and a second portion;
- identifying a first intra-prediction mode based on the segmentation;
- generating, for at least some of a plurality of pixels in the first portion, corresponding predicted values according to the first intra-prediction mode;
- identifying a second intra-prediction mode based on the segmentation, such that the second intra-prediction mode differs from the first intra-prediction mode;
- generating, for at least some of a plurality of pixels in the second portion, corresponding predicted values according to the second intra-prediction mode; and
- encoding the current block using the predicted values corresponding to the first portion and the predicted values corresponding to the second portion.

20. The method of claim 19, wherein identifying the segmentation is independent of scan order.

* * * * *